(12) United States Patent
Blackhurst et al.

(10) Patent No.: US 8,442,894 B2
(45) Date of Patent: May 14, 2013

(54) GUARANTEED MERCHANT PAYMENT IN A CARD-NOT-PRESENT TRANSACTION

(75) Inventors: Jason Blackhurst, Charlotte, NC (US); Michael W. Upton, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/013,684

(22) Filed: Jan. 25, 2011

(65) Prior Publication Data

US 2011/0191162 A1 Aug. 4, 2011

Related U.S. Application Data

(60) Provisional application No. 61/299,695, filed on Jan. 29, 2010.

(51) Int. Cl.
G06Q 40/00 (2012.01)
(52) U.S. Cl.
USPC .......................................... 705/36 R; 705/35
(58) Field of Classification Search .................... 705/35, 705/36 R
See application file for complete search history.

(56) References Cited

U.S. PATENT DOCUMENTS

| 5,717,923 A | 2/1998 | Dedrick |
| 5,761,648 A | 6/1998 | Golden et al. |
| 5,870,770 A | 2/1999 | Wolfe |
| 5,907,830 A | 5/1999 | Engel et al. |
| 5,933,811 A | 8/1999 | Angles et al. |
| 6,006,252 A | 12/1999 | Wolfe |
| 6,009,411 A | 12/1999 | Kepecs |
| 6,009,413 A | 12/1999 | Webber et al. |
| 6,041,309 A | 3/2000 | Laor |
| 6,055,573 A | 4/2000 | Gardenswartz et al. |
| 6,076,069 A | 6/2000 | Laor |
| 6,163,772 A * | 12/2000 | Kramer et al. .................. 705/79 |
| 6,223,163 B1 | 4/2001 | Van Luchene |
| 6,263,351 B1 | 7/2001 | Wolfe |
| 6,282,567 B1 | 8/2001 | Finch, II et al. |
| 6,292,786 B1 | 9/2001 | Deaton et al. |
| 6,292,813 B1 | 9/2001 | Wolfe |
| 6,317,718 B1 | 11/2001 | Fano |
| 6,321,208 B1 | 11/2001 | Barnett et al. |
| 6,330,543 B1 | 12/2001 | Kepecs |
| 6,332,126 B1 | 12/2001 | Peirce et al. |
| 6,336,099 B1 | 1/2002 | Barnett et al. |
| 6,336,131 B1 | 1/2002 | Wolfe |
| 6,341,305 B2 | 1/2002 | Wolfe |
| 6,349,290 B1 | 2/2002 | Horowitz et al. |

(Continued)

OTHER PUBLICATIONS

Clark, Ken. A carnival of crime. Chain Store Age. vol. 79 Issue 1 p. 70. Lebhar-Friedman, Inc. NY. Jan. 2003.*

(Continued)

*Primary Examiner* — Muriel Tinkler
(74) *Attorney, Agent, or Firm* — Michael A. Springs; Moore & Van Allen PLLC; James C. Moore

(57) ABSTRACT

Embodiments of the invention provide for systems, devices, apparatus, methods and computer program products for payment card-issuing entities to guarantee merchant payment in card-not-present-transactions and, more specifically, automatically guaranteeing merchant payment in card-not-present transactions based on the payment card-issuing entity authenticating the customer prior to the transactions. By guaranteeing merchant payment in card-not-present transactions, the merchant's risk associated with such transaction is greatly reduced.

27 Claims, 10 Drawing Sheets

U.S. PATENT DOCUMENTS

| | | | |
|---|---|---|---|
| 6,385,592 | B1 | 5/2002 | Angles et al. |
| 6,434,534 | B1 | 8/2002 | Walker et al. |
| 6,505,168 | B1 | 1/2003 | Rothman et al. |
| 6,611,814 | B1 | 8/2003 | Lee et al. |
| 6,615,184 | B1 | 9/2003 | Hicks |
| 6,622,174 | B1 | 9/2003 | Ukita et al. |
| 6,678,685 | B2 | 1/2004 | McGill et al. |
| 6,782,370 | B1 | 8/2004 | Stack |
| 6,865,545 | B1 | 3/2005 | Epstein et al. |
| 6,925,444 | B1 | 8/2005 | McCollom et al. |
| 6,937,995 | B1 | 8/2005 | Kepecs |
| 7,024,374 | B1 | 4/2006 | Day et al. |
| 7,043,526 | B1 | 5/2006 | Wolfe |
| 7,099,832 | B2 | 8/2006 | Walker et al. |
| 7,124,096 | B2 | 10/2006 | Dutta et al. |
| 7,127,414 | B1 | 10/2006 | Awadallah et al. |
| 7,162,443 | B2 | 1/2007 | Shah |
| 7,181,488 | B2 | 2/2007 | Martin et al. |
| 7,231,357 | B1 | 6/2007 | Shanman et al. |
| 7,236,942 | B1 | 6/2007 | Walker et al. |
| 7,246,310 | B1 | 7/2007 | Wolfe |
| 7,249,058 | B2 | 7/2007 | Kim et al. |
| 7,257,604 | B1 | 8/2007 | Wolfe |
| 7,302,429 | B1 | 11/2007 | Wanker |
| 7,302,638 | B1 | 11/2007 | Wolfe |
| 7,315,834 | B2 | 1/2008 | Martineau et al. |
| 7,324,965 | B2 | 1/2008 | Martineau et al. |
| 7,340,419 | B2 | 3/2008 | Walker et al. |
| 7,356,490 | B1 | 4/2008 | Jacobi et al. |
| 7,386,477 | B2 | 6/2008 | Fano |
| 7,398,248 | B2 | 7/2008 | Phillips et al. |
| 7,433,874 | B1 | 10/2008 | Wolfe |
| 7,464,050 | B1 | 12/2008 | Deaton et al. |
| 7,472,088 | B2 | 12/2008 | Taylor et al. |
| 7,490,056 | B2 | 2/2009 | Nash |
| 7,512,551 | B2 | 3/2009 | Postrel |
| 7,536,385 | B1 | 5/2009 | Wolfe |
| 7,552,080 | B1 | 6/2009 | Willard et al. |
| 7,578,435 | B2 | 8/2009 | Suk |
| 7,593,862 | B2 | 9/2009 | Mankoff |
| 7,599,850 | B1 | 10/2009 | Laor |
| 7,606,736 | B2 | 10/2009 | Martineau et al. |
| 2002/0062249 | A1 | 5/2002 | Iannacci |
| 2002/0091571 | A1 | 7/2002 | Thomas et al. |
| 2002/0190118 | A1 | 12/2002 | Davenport et al. |
| 2004/0226995 | A1 | 11/2004 | Smith |
| 2005/0173517 | A1 | 8/2005 | Suk et al. |
| 2005/0177437 | A1 | 8/2005 | Ferrier |
| 2007/0005426 | A1 | 1/2007 | Walker et al. |
| 2007/0136418 | A1 | 6/2007 | Wolfe |
| 2007/0255620 | A1 | 11/2007 | Tumminaro et al. |
| 2008/0091535 | A1 | 4/2008 | Heiser, II et al. |
| 2008/0133336 | A1 | 6/2008 | Altman et al. |
| 2008/0162316 | A1 | 7/2008 | Rampell et al. |
| 2008/0221986 | A1 | 9/2008 | Soicher et al. |
| 2008/0249941 | A1 | 10/2008 | Cooper |
| 2008/0277465 | A1 | 11/2008 | Pletz et al. |
| 2009/0070222 | A1* | 3/2009 | Kestenbaum .................. 705/14 |
| 2009/0094125 | A1 | 4/2009 | Killian et al. |
| 2009/0132366 | A1 | 5/2009 | Lam et al. |
| 2009/0132415 | A1 | 5/2009 | Davis et al. |
| 2009/0170483 | A1 | 7/2009 | Barnett et al. |
| 2009/0172728 | A1 | 7/2009 | Shkedi et al. |
| 2009/0292599 | A1 | 11/2009 | Rampell et al. |
| 2009/0313106 | A1 | 12/2009 | Taylor et al. |
| 2009/0319638 | A1 | 12/2009 | Faith et al. |
| 2010/0229245 | A1* | 9/2010 | Singhal ......................... 726/28 |

OTHER PUBLICATIONS

International Search Report and the Written Opinion of the International Searching Authority mailed Mar. 25, 2011 for International Application No. PCT/US 11/22781.

International Search Report and the Written Opinion of the International Searching Authority mailed Mar. 25, 2011 for International Application No. PCT/US 11/22783.

International Search Report and the Written Opinion of the International Searching Authority mailed Mar. 28, 2011 for International Application No. PCT/US 11/22771.

International Search Report and the Written Opinion of the International Searching Authority mailed Mar. 29, 2011 for International Application No. PCT/US 11/22779.

International Search Report and the Written Opinion of the International Searching Authority mailed Mar. 29, 2011 for International Application No. PCT/US 11/22785.

International Search Report and the Written Opinion of the International Searching Authority mailed Apr. 8, 2011 for International Application No. PCT/US 11/22765.

Related U.S. Appl. No. 13/013,683, filed Jan. 25, 2011.
Related U.S. Appl. No. 13/013,685, filed Jan. 25, 2011.
Related U.S. Appl. No. 13/013,688, filed Jan. 25, 2011.
Related U.S. Appl. No. 13/013,689, filed Jan. 25, 2011.
Related U.S. Appl. No. 13/013,691, filed Jan. 25, 2011.
Related U.S. Appl. No. 13/013,720, filed Jan. 25, 2011.
Related U.S. Appl. No. 13/013,722, filed Jan. 25, 2011.
Related U.S. Appl. No. 13/013,727, filed Jan. 25, 2011.
Related U.S. Appl. No. 13/013,730, filed Jan. 25, 2011.
Related U.S. Appl. No. 13/013,731, filed Jan. 25, 2011.
Related U.S. Appl. No. 13/013,735, filed Jan. 25, 2011.

* cited by examiner

GUARANTEED MERCHANT PAYMENT IN A CARD-NOT-PRESENT TRANSACTION

CLAIM OF PRIORITY UNDER 35 U.S.C. §119

The present application for patent claims priority to Provisional Application No. 61/299,695 entitled "Guaranteed Merchant Payment in a Card-Not-Present Transaction" filed Jan. 29, 2010 and assigned to the assignee hereof and hereby expressly incorporated by reference herein.

FIELD

In general, embodiments of the invention relate to methods, systems, apparatus and computer program products for merchant payment in card-not-present transactions and, more particularly, guaranteeing merchant payment in a card-not-present transaction based on authentication of the customer.

BACKGROUND

A card-not-present transaction refers to transactions conducted in which neither the payment card nor the customer are present at the point-of-sale. Examples, of card-not-present transactions include, but are not limited to, mail order transactions, telephone transactions, facsimile (fax) transactions, or Internet/e-commerce transactions. In all of the examples neither the customer nor the payment card are in the same physical location as the merchant.

In traditional card-not-present transactions the merchant is not guaranteed payment by the financial institution if the transaction is conducted fraudulently. A fraudulent transaction may be one in which the user of the payment card in the card-not-present-transaction is not the owner or rightful possessor of the payment card. For example, the user has stolen the card from the actual authorized card owner or otherwise wrongfully comes into possession of the payment card and proceeds to conduct card-not-present transactions using the card. This type of transaction is more prone to be fraudulent because, unlike face-to-face card-present transactions, the wrongful possessor of the payment card does not have to verify that they are the named individual on the payment card. Typically, in card-not-present transactions, the merchant is either unable to verify the identity of the payment card user or unwilling to implement the necessary procedures to verify the identity of the payment card user.

Therefore, a need exists to develop systems, methods, apparatus, computer programs and the like that provide for the merchant to be guaranteed payment by the card-issuing entity for card-not-present transactions. Such a desired system would eliminate the risk that merchants incur when they conduct card-not-present transactions and are unable to verify that the customer is within right to use the payment card.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product, and/or other device), methods, or a combination of the foregoing for card-issuing entities to guarantee merchant payment in card-not-present-transactions and, more specifically, guaranteeing merchant payment in card-not-present transactions by having the card-issuing entity or some entity authorized on behalf of the card-issuing entity, authenticate the customer. The merchant payment guarantee provides for the financial institution or some other card-issuing entity to settle payment with the merchant in the event that financial institution/card-issuing entity would otherwise deny payment, for example if the transaction was conducted via fraudulent use of the payment card.

A method for providing guaranteed merchant payment for a card-not-present transaction defines first embodiments of the invention. The method includes determining, via a computing device processor, authentication of a customer associated with a payment card. The method further includes receiving, at a computing device, notification of a first card-not-present transaction conducted between the customer, using the payment card, and a first merchant. The method further includes indicating, via a computing device processor, in a first transaction record that the first merchant is guaranteed payment, for the first card-not-present transaction, by an entity issuing the payment card based on the authentication of the customer.

In specific embodiments of the method determining authentication further includes determining, via the computing device processor, authentication of the customer on behalf of an entity issuing the payment card. In other specific embodiments of the method, determining authentication further comprises verifying, via a computing device processor, a customer name and customer password. While in still further specific embodiments, determining authentication further comprises verifying, via a computing processor, a cookie stored on a computing device associated with the customer.

In other specific embodiments the method includes providing, via a computing device, one or more offers, associated with the first merchant, to the customer. In such embodiments of the method receiving may further include receiving, at the computing device, the notification of the first card-not-present transaction, wherein the first card-not-present transaction is based on customer acceptance of at least one of the one or more offers. In other specific related embodiments of the method determining authentication may further include determining, via the computing device processor, authentication of the customer prior to providing the one or more offers to the customer. In such embodiments of the method, providing the one or more offers may further include determining, via a computing device, customer-specific offers based on the authentication of the customer.

In additional specific embodiments the method includes providing, via computing device processor, the guaranteed payment to the first merchant within a predetermined period of time.

Further specific embodiments of the method include receiving, at a computing device, notification of a second card-not-present transaction associated with the payment card and conducted between the customer and a second merchant, and indicating, via a computing device processor, in a second transaction record that the second merchant is guaranteed payment, for the card-not-present transaction, by an entity issuing the payment card based on the authentication of the customer.

An apparatus for providing guaranteeing merchant payment in a card-not-present transaction provides for second embodiments of the invention. The apparatus includes a computing platform including at least one processor and a memory. The apparatus further includes an authentication routine stored in the memory executable by the processor and configured to determine authentication of a customer associated with a payment card. The apparatus further includes a merchant payment routine stored in the memory executable by the processor and configured to receive notification of a first card-not-present transaction conducted between the customer, using the payment card, and a first merchant and configured to indicate in a first transaction record that the first merchant is guaranteed payment, for the card-not-present transaction, by an entity issuing the payment card based on the authentication of the customer.

In specific embodiments of the apparatus the authentication routine is further configured to determine authentication of the customer on behalf of an entity issuing the payment card. In further specific embodiments of the apparatus, the authentication routine is further configured to verify a customer name and customer password. In still further specific embodiments of the apparatus, the authentication routine is further configured to verify a cookie stored on a computing device associated with the customer.

In other specific embodiments the apparatus includes a merchant offer routine stored in the memory, executable by the processor and configured to provide one or more offers, associated with the first merchant, to the customer. In such embodiments of the apparatus the merchant payment routine may be further configured to receive the notification of the first card-not-present transaction, in which the first card-not-present transaction is based on customer acceptance of at least one of the one or more offers. In other such embodiments of the apparatus, the authentication routine may be further configured to determine authentication of the customer prior to providing the one or more offers to the customer. In such embodiments of the apparatus, the merchant offer routine may be further configured to determine customer-specific offers based on the authentication of the customer and provide the customer-specific offers, associated with the first merchant, to the customer.

In other specific embodiments of the apparatus, the merchant payment routine is further configured to provide the guaranteed payment to the first merchant within a predetermined period of time.

Moreover, in other specific embodiments of the apparatus the merchant payment routine is further configured to receive notification of a second card-not-present transaction associated with the payment card and conducted between the customer and a second merchant, and indicate in a second transaction record that the second merchant is guaranteed payment, for the card-not-present transaction, by an entity issuing the payment card based on the authentication of the customer.

A computer program product including a non-transitory computer-readable medium defines third embodiments of the invention. The computer-readable medium includes a first set of codes for causing a computer to determine authentication of a customer associated with a payment card. The computer-readable medium additionally includes a second set of codes for causing a computer to receive notification of a first card-not-present transaction conducted between the customer, using the card, and a first merchant. The computer-readable medium also includes a third set of codes for causing a computer to indicate in a first transaction record that the first merchant is guaranteed payment, for the card-not-present transaction, by an entity issuing the payment card based on the authentication of the customer.

Thus, systems, apparatus, methods, and computer program products herein described provide for the payment card-issuing entity to guarantee payment to the merchant in card-not-present types of transactions and more specifically, guaranteeing merchant payment in card-not-present type of transactions based on the card-issuing entity or a third party operating on behalf of the card-issuing entity, authenticating the customer conducting the card-not-present transaction.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
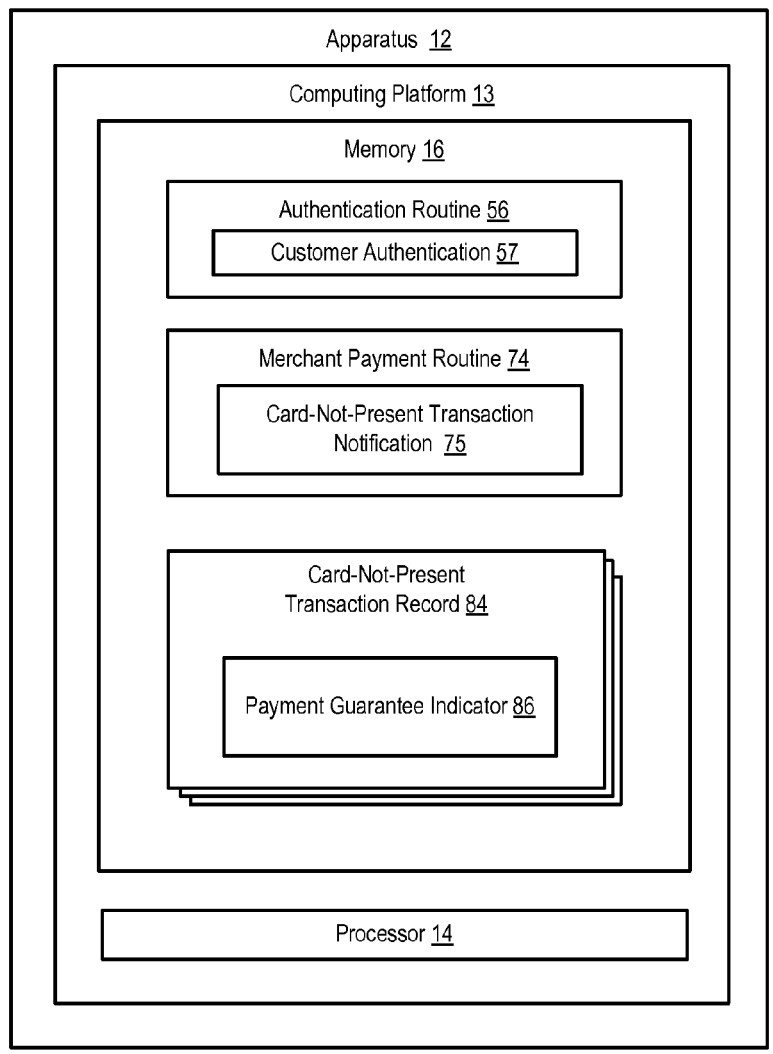
Figure 2:
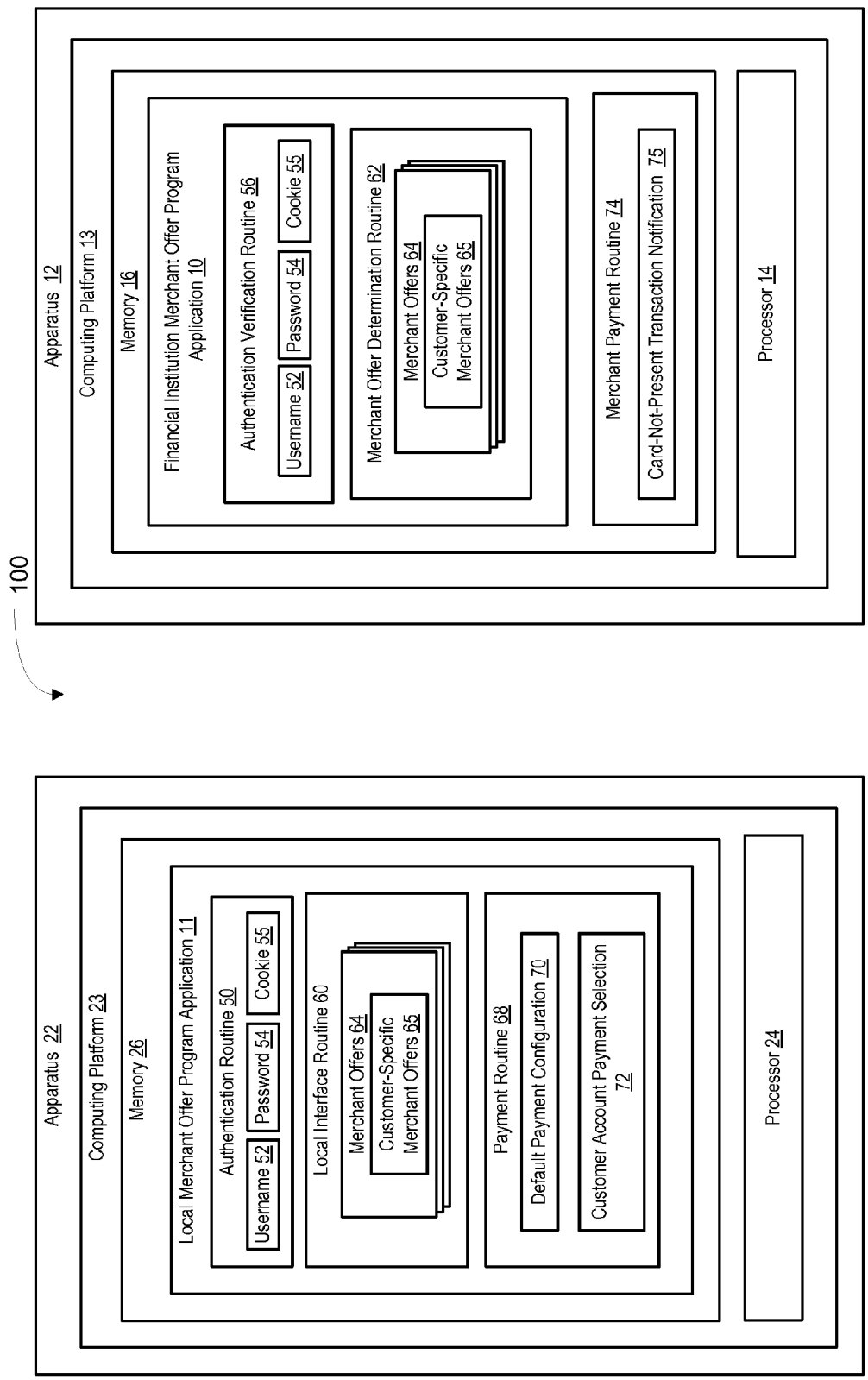
Figure 3:
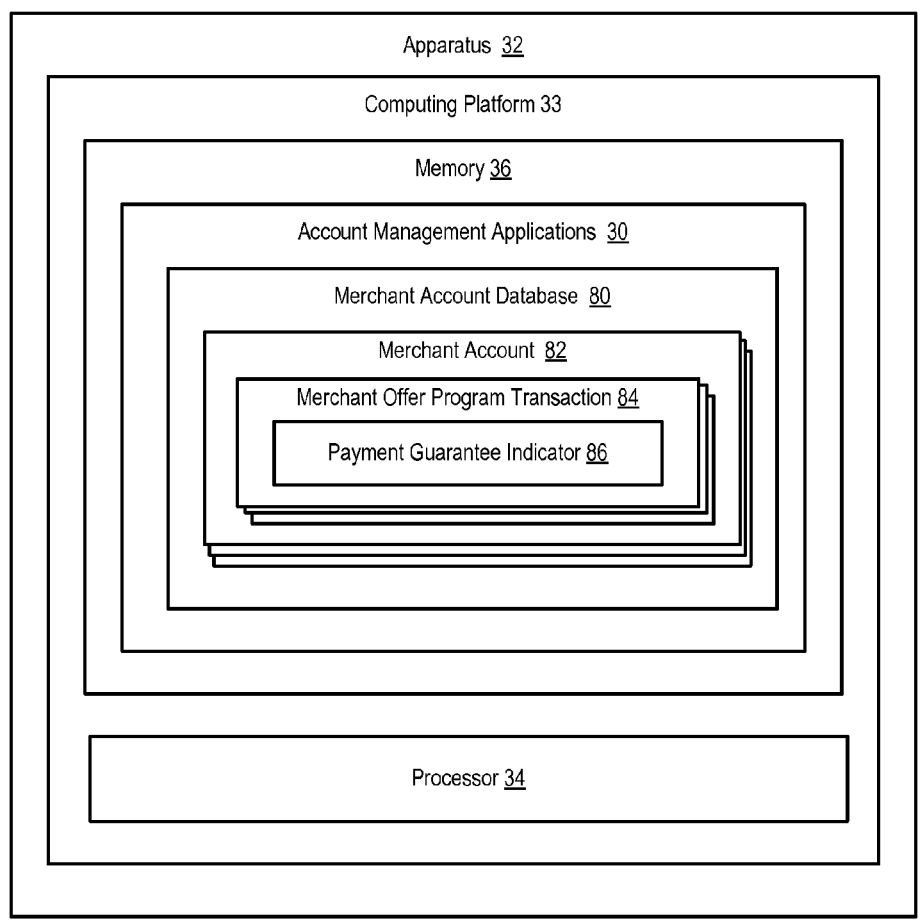
Figure 4:
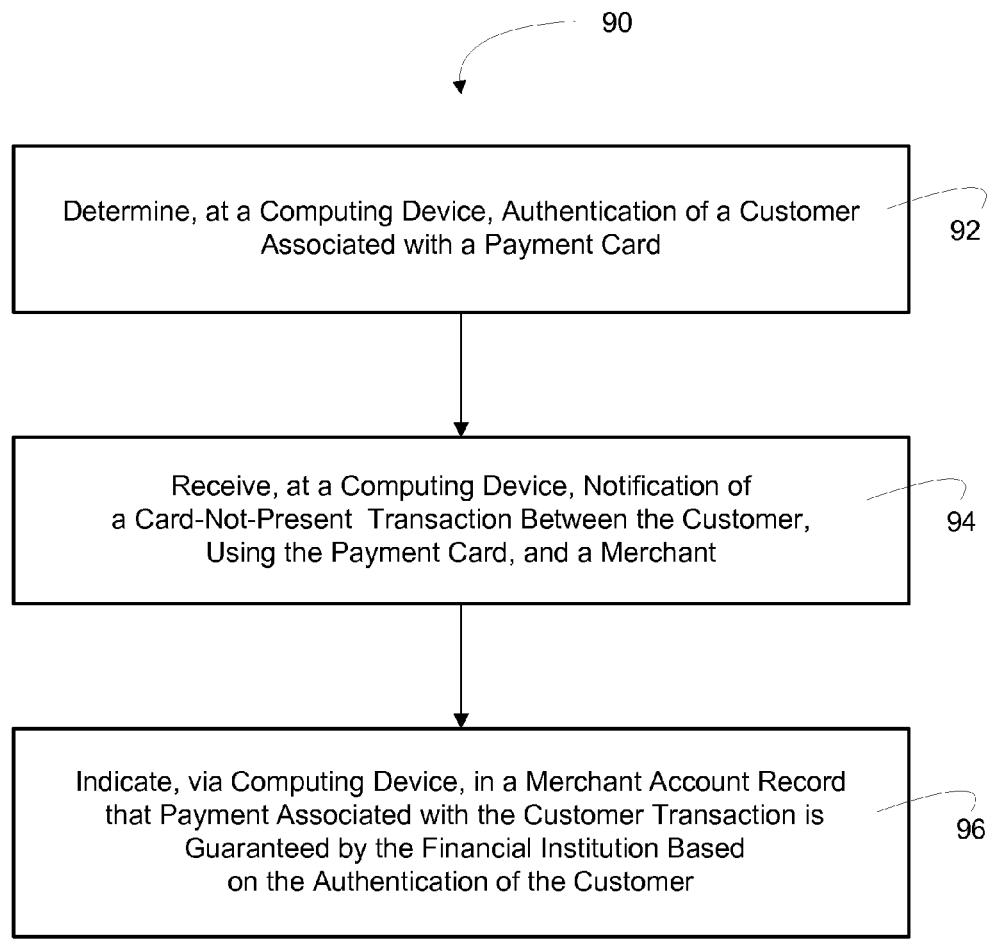
Figure 5:
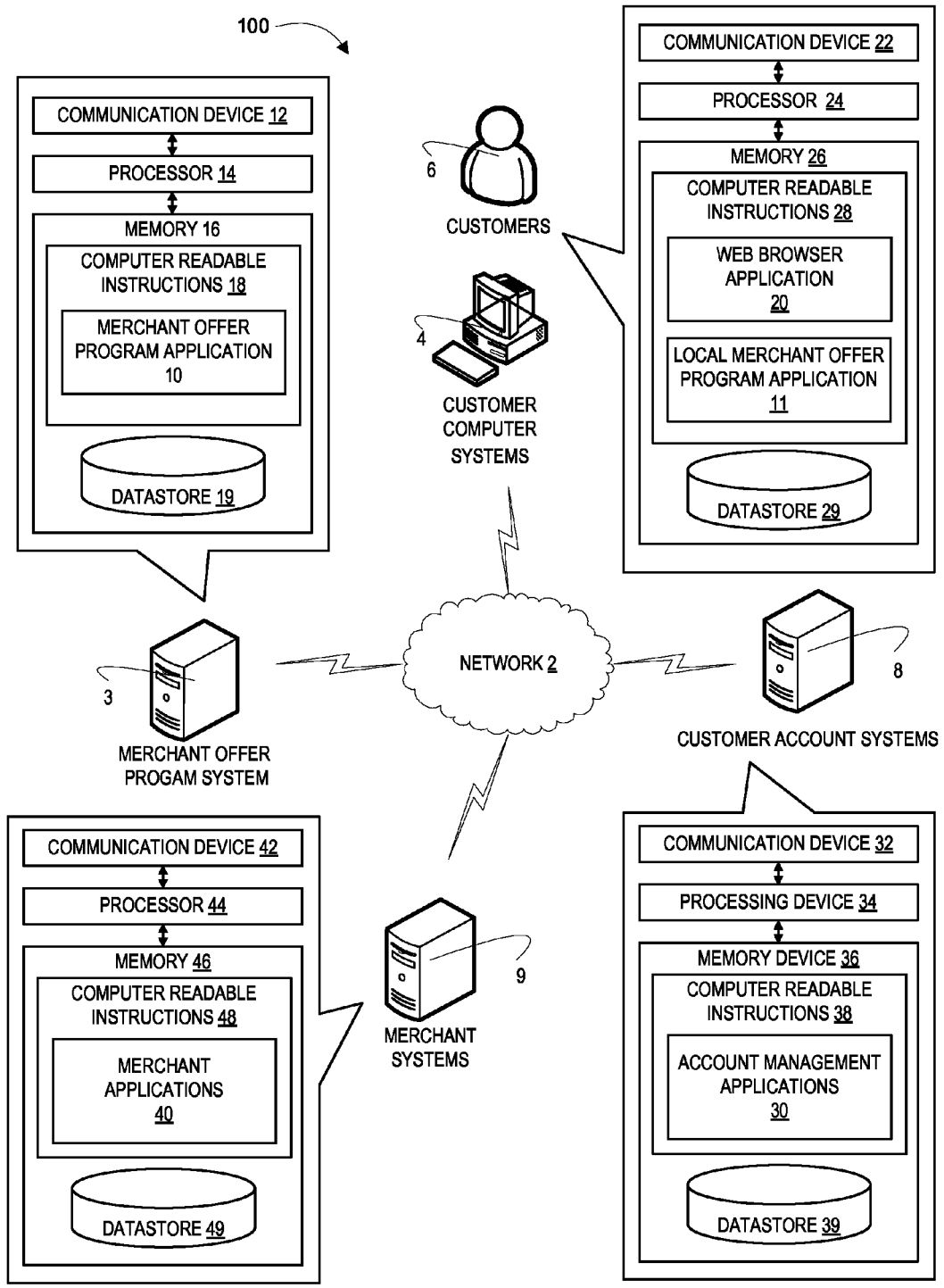
Figure 6A:
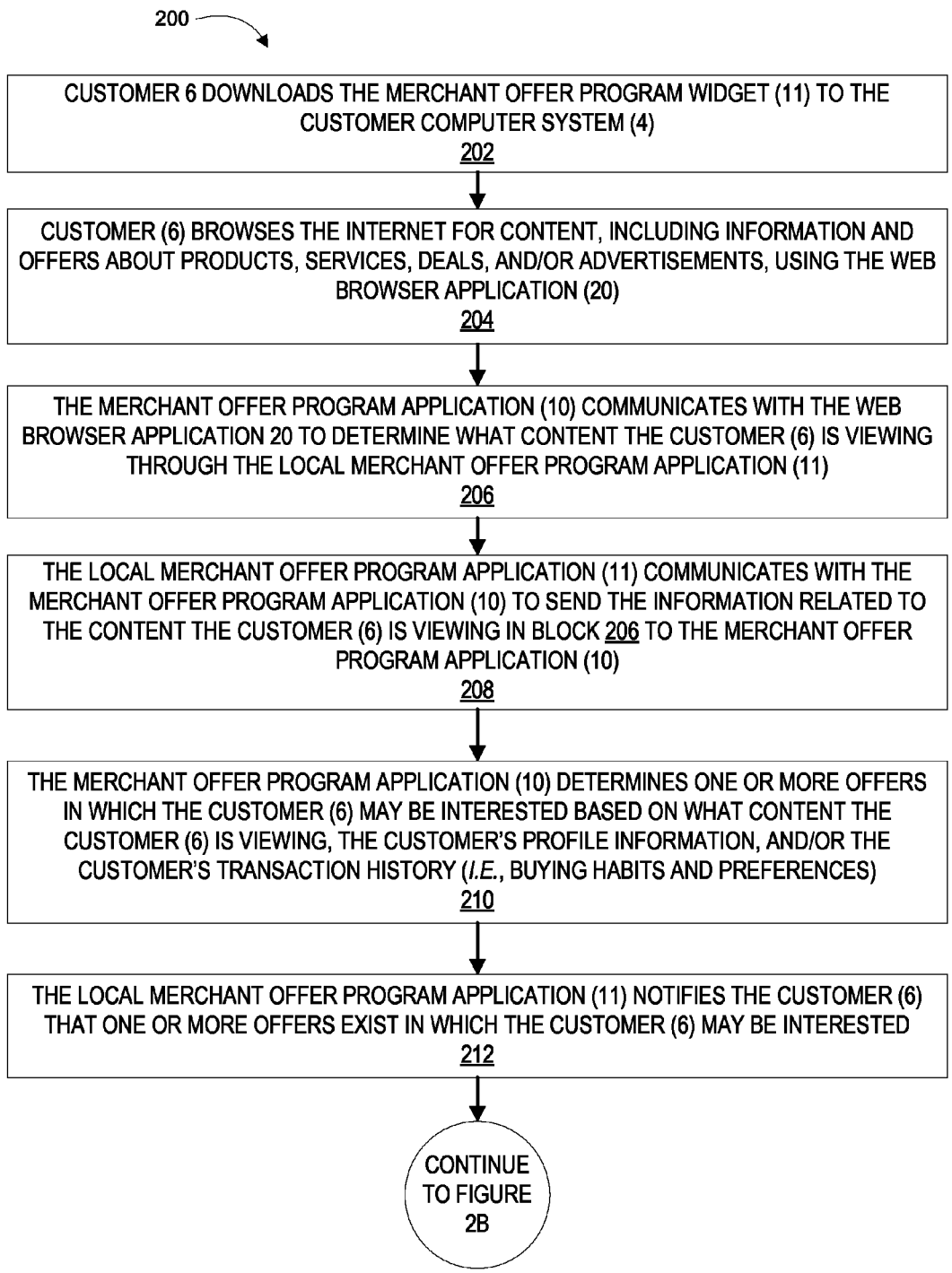
Figure 6B:
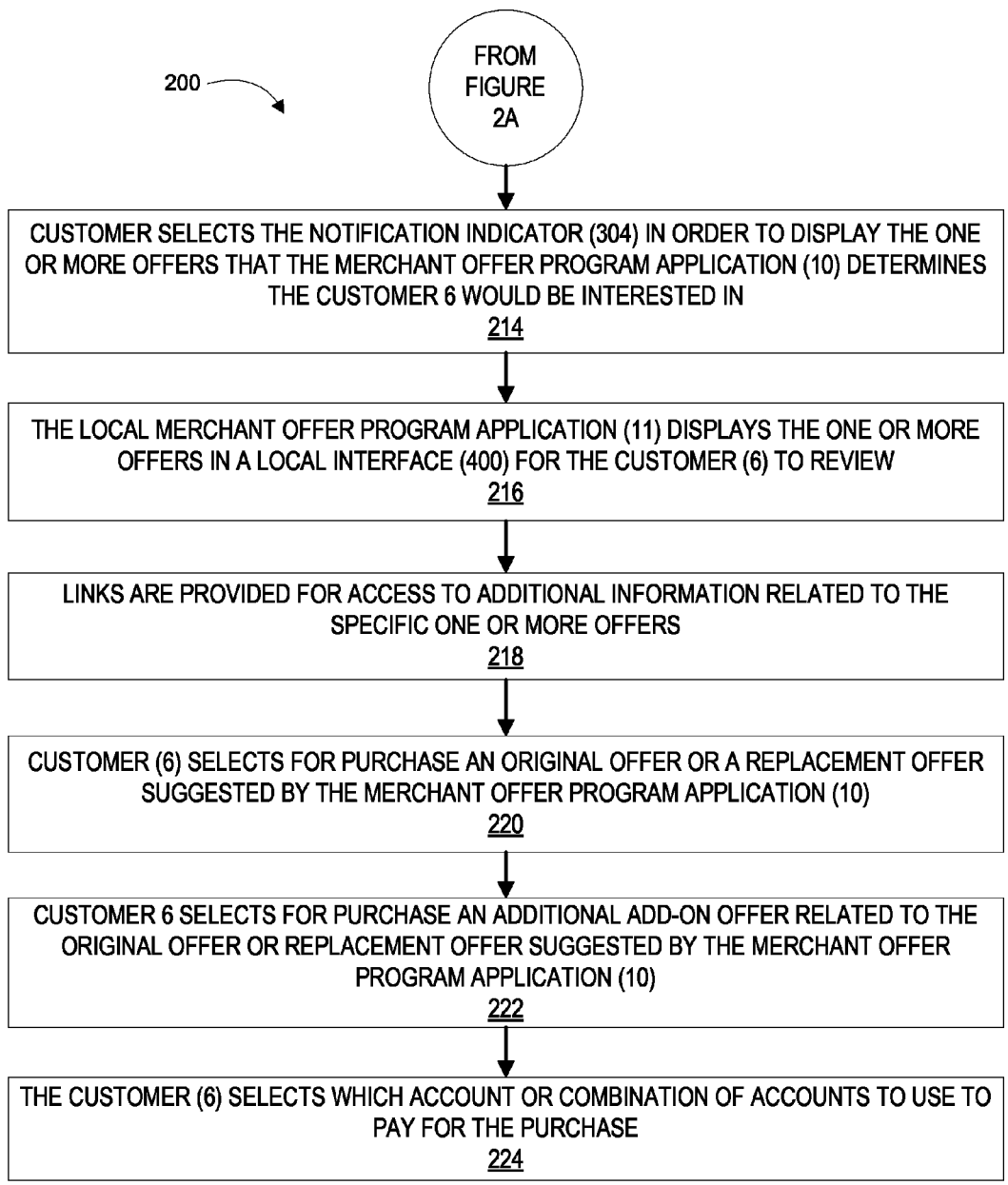
Figure 7:
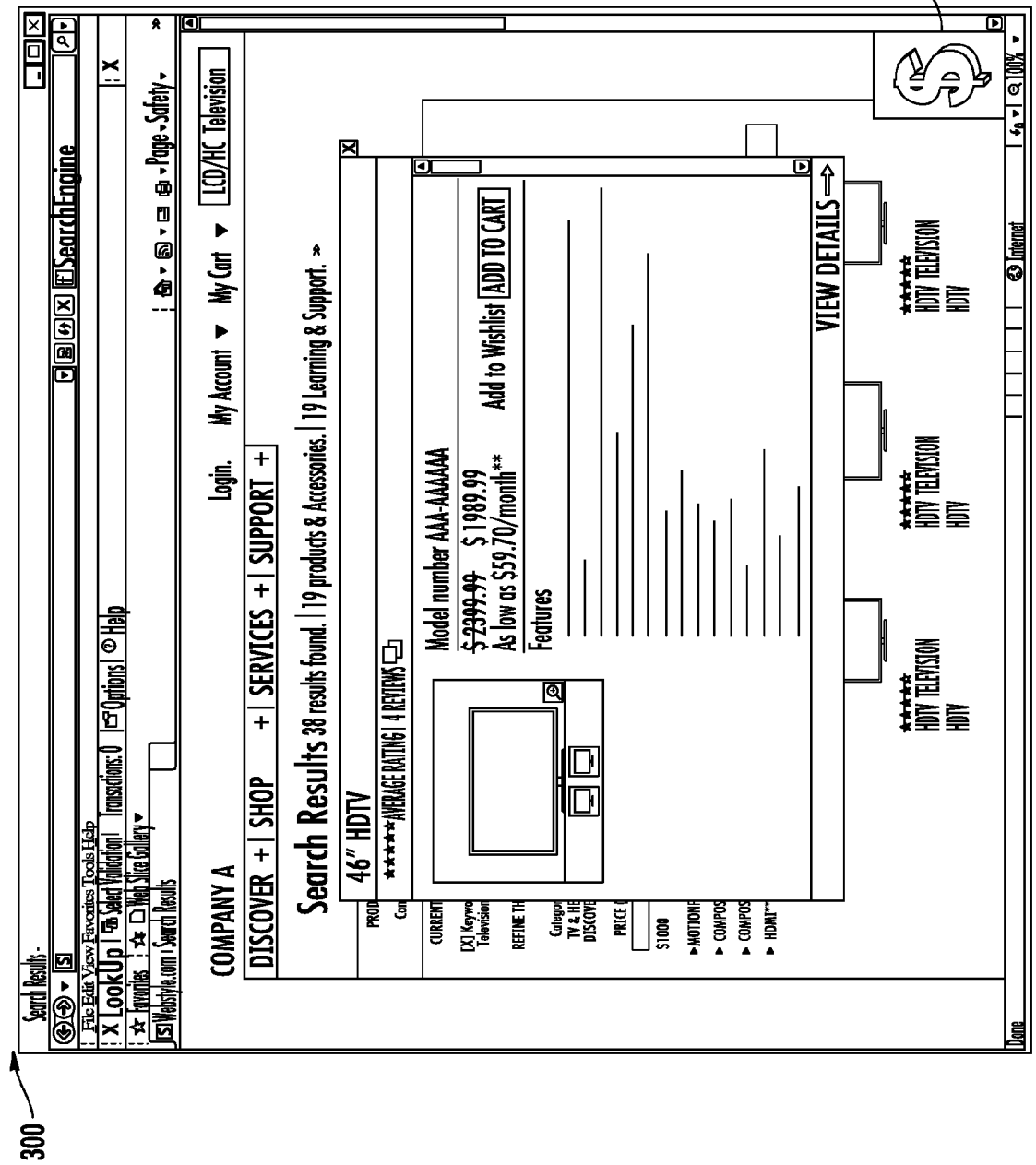
Figure 8:
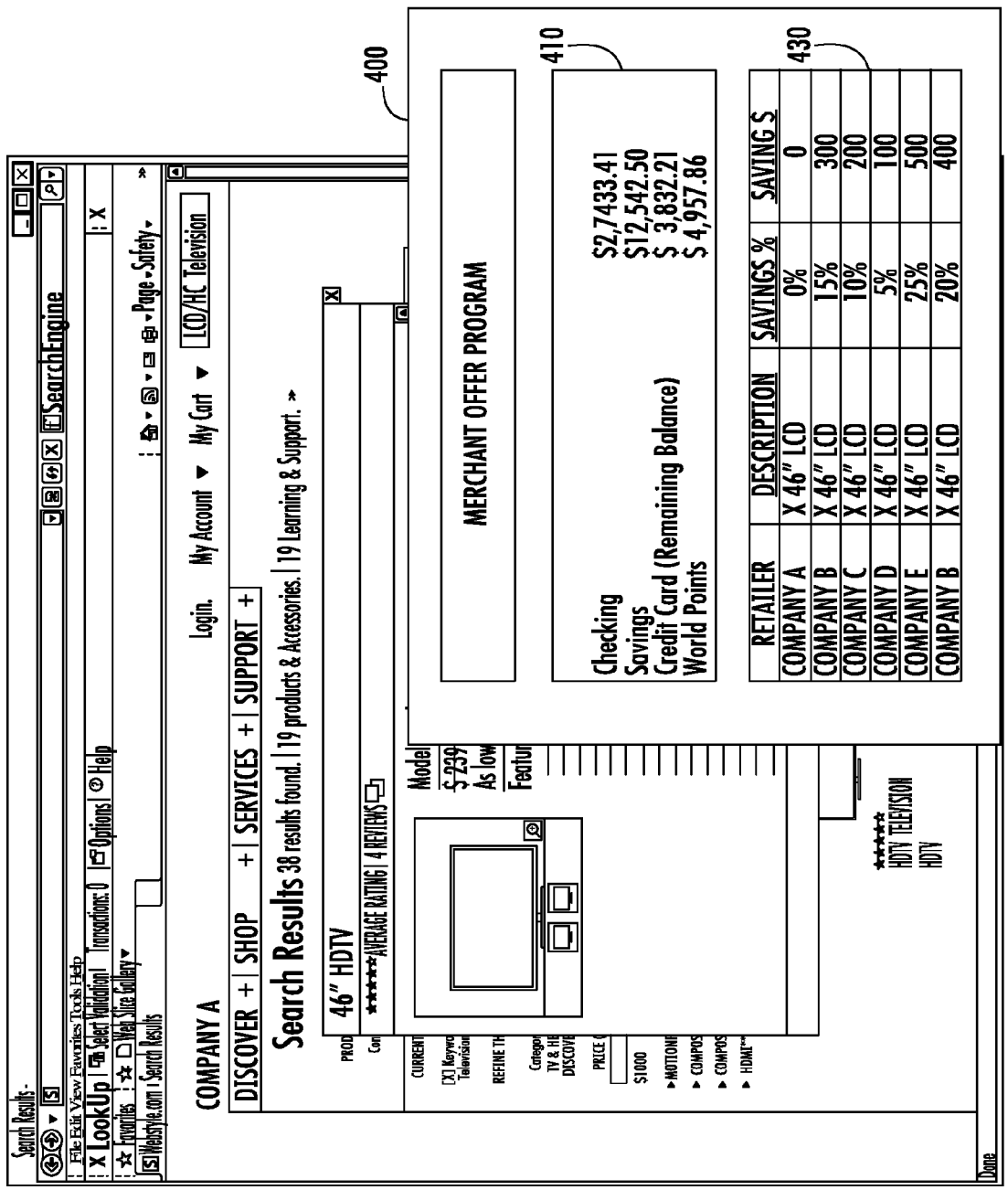
Figure 9:
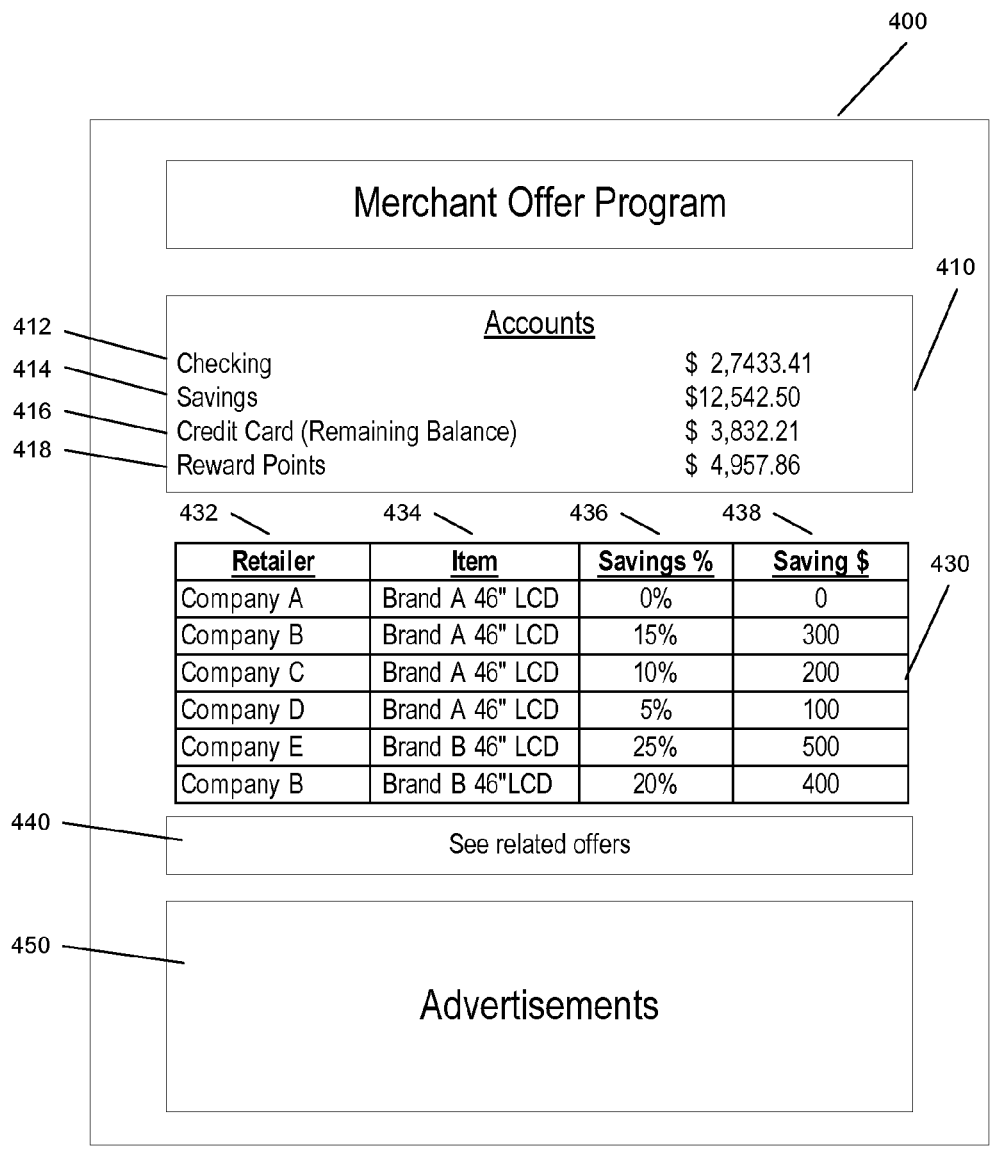

Having thus described embodiments of the invention in general terms, reference will now be made to the accompanying drawings, which are not necessarily drawn to scale, and wherein:

FIG. 1 is a block diagram of an apparatus configured for providing payment guarantee to merchants in card-not-present transactions; in accordance with embodiments of the present invention;

FIG. 2 provides a block diagram illustrating customer and financial institution apparatus for implementing a financial institution-based merchant offer program including guaranteed merchant payment in card-not-present transactions, in accordance with present embodiments of the invention;

FIG. 3 provides a block diagram illustrating a financial institution apparatus for indicating/storing a guaranteed payment transaction associated with the merchant offer program, in accordance with embodiments of the present invention;

FIG. 4 provides a flow diagram of a method for providing payment guarantee to merchants in card-not-present transactions, in accordance with embodiments of the present invention;

FIG. 5 provides a block diagram illustrating a comprehensive financial institution-based merchant offer program environment which may implemented in conjunction with guaranteeing merchant payment in card-not-present transactions, in accordance with an embodiment of the present invention;

FIG. 6A provides an integrated online financial banking and customer shopping process implemented in a financial institution-based merchant offer program, in accordance with an embodiment of the present invention;

FIG. 6B provides a continuation of the integrated online financial banking and customer shopping process implemented in a financial institution-based merchant offer program, in accordance with an embodiment of the present invention;

FIG. 7 provides a web browser and merchant offer program notification alert implemented in the financial institution-based merchant offer program, in accordance with an embodiment of the present invention;

FIG. 8 provides a local-based merchant offer program application interface implemented in conjunction with the financial institution-based merchant offer program, in accordance with an embodiment of the present invention; and FIG. 9 provides a local-based merchant offer program application interface activated by a customer searching the Internet and used in conjunction with the financial institution-based merchant offer program, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments of the present invention provide for systems, devices, apparatus, methods and computer program products for the guaranteeing of merchant payment by card-issuing entities in card-not-present types of transactions. Specifically, embodiments herein disclosed provide for guaranteeing of merchant payment by card-issuing entities in card-not-present types of transactions based on the card-issuing entity authenticating the customer conducting the card-not-present transaction.

As used herein the term "card-not-present transaction" refers to transactions conducted in which neither the payment card nor the customer are present at the point-of-sale. Examples, of card-not-present transactions include, but are not limited to, mail order transactions, telephone transactions, facsimile (fax) transactions, or Internet/e-commerce transactions. In all of the examples neither the customer nor the payment card are in the same physical location as the merchant.

Referring to FIG. 1 a high level block diagram is presented of an apparatus 12 configured to provide guaranteed merchant payment in card-not-present transactions in accordance with embodiments of the present invention. The apparatus 12, which may include multiple computing devices, includes a computing platform 13 having at least one processor 14 and a memory 16 in communication with the processor 14.

The memory 16 of apparatus 12 stores authentication routine 56 that is configured to determine authentication of a customer associated with a payment card. Authentication routine 56 may be configured to provide customer authentication 57 by any known or future known authentication technique, including verification of customer credentials, such as a user name and pass code/word, verification of a cookie stored on the customer's computing device, or the like. In specific embodiments, the authentication routine 56 will be executed by the payment card-issuing entity or a third party on behalf of the payment-issuing entity, such that the payment card issuing-entity is the entity "authenticating" the customer.

The memory 16 of apparatus 12 additionally stores merchant payment routine 74 that is configured to receive notification of a card-not-present transaction conducted between a merchant and the authenticated customer using the payment card. The merchant payment routine 74, which is executed by the card-issuing entity, may be configured to receive the notification via any known or future known transaction processing and notification system, such as an Internet transaction processing and notification system or the like. In addition, merchant payment routine 74 is configured to provide a payment guarantee indicator 86 in a corresponding card-not-present transaction record 84 that indicates that the merchant is guaranteed payment for the card-not-present transaction based on the authentication of the customer. The payment guarantee indicator 86 provides for the merchant to be paid by the payment card-issuing entity, regardless of subsequent circumstance such as, the customer fails to fulfill their payment obligation, the transaction is deemed fraudulent or the like.

In specific embodiments of the invention, the merchant payment routine 74 may include logic to verify a requisite nexus between the authentication of the customer and the card-not-payment transaction, such that the guaranteed payment indicator 86 is only added to the transaction record 84 in the event that the nexus is verified. For example, the nexus in an Internet-based card-not-present transaction may be verification that the authentication and the transaction occurred during the same Internet session as the authentication and/or that the transaction occurred within a prescribed time limit after the authentication. In another example, the nexus in a telephone-based card-not-present transaction may be verification that the authentication and the transaction occurred during the same telephone call or the like. In other embodiments of the invention, verification of the nexus between the authentication of the customer and the card-not-present transaction may occur prior to the merchant payment routine 74 receiving the card-not-present transaction notification 75; in such instances the notification 75 may include information associated with the verification of the requisite nexus.

Additionally, it should be noted that during a valid authentication period the customer may conduct more than one card-not-present transaction with different merchants and each of the transactions may be payment guaranteed based on predetermined arrangements between the merchant and the card-issuing entity. Thus, the card-issuing entity may receive additional card-not-present transaction notifications associated with the customer and other merchants that are based on the authentication process and, based on a predetermined arrangement between the card-issuing entity and the other merchants, the transaction may be designated as a payment guaranteed transaction.

From a business perspective, the card issuing-entity is able to provide guaranteed payment to merchants in return for merchant-provided consideration. The merchant-provided consideration may be a fee provided to the card issuing-entity or a reduction in fees associated with the card-issuing entity processing payment of the transaction. In additional embodiments, as described in more detail below, guaranteeing merchant payment may provide merchants incentive to participate in financial institution programs, such as financial institution merchant offer programs, in which the financial institution provides merchant offers to their customers based on a predetermined relationship between the merchants and the financial institutions. By offering the merchants guaranteed payments in card-not-present transactions associated with the merchant offer program, merchants are more willing to participate in the program, whereby merchants offer products/services to the financial institution customers at a discount or the like.

Referring to FIG. 2 a block diagram is shown of a financial institution-based merchant offer program environment 100, which may be implemented in conjunction with guaranteed merchant payment of card-not-present transactions; in accordance with embodiments of the present invention is illustrated. Additionally details associated with the system are shown and described in relation to FIGS. 5-9, infra. The financial institution-based merchant offer programs provides for establishing relationships between the financial institution and the merchants whereby merchant offers are provided to financial institution customers. Offers include but are not limited to products, services, discounts, coupons, promotions, add-on sales, upsells, rebates, advertisements, marketing information, etc. In addition, as previously noted the relationship between the financial institution and merchants affords the financial institutions the ability to offer guaranteed payment to the merchants in card-not-present transactions.

In addition, since the merchant offer program herein described provides for authenticating the user/customer either prior to providing the user/customer with offers or prior to conducting a transaction related to the offers, the merchant offer program is ideally suited to guaranteeing merchant payment for card-not-present transactions based on the inclusion of the authentication process.

Financial institution-based merchant offer program environment 100 includes customer apparatus 22 and financial institution apparatus 12. Customer apparatus 22 may comprise any computing device or combination of computing devices, such as personal computer, laptop computer, mobile device, such as personal digital assistant (PDA), automated teller machine (ATM), smart telephone or the like. The financial institution apparatus 12 may comprise any computing device or combination of computing devices, such as servers, mainframe computers, or the like.

The customer apparatus 22 includes a computing platform 23 having at least one processor 24 and a memory 26. The memory 26 includes local merchant offer program application 11 that is configured to provide the financial institution customer with merchant offers based on the financial institution's predetermined relationship with a plurality of merchants. In accordance with specific embodiments of the invention, the local merchant offer program application is customer configurable. Configuration may include specifying which types of offers are to be presented, from which merchants the customer desires offers to be presented, the time of day the customer desires offers to be presented and the like. In addition, as described below, configuration may provide for the customer to pre-configure and/or choose payment options for a specified transaction based on a merchant offer. The local merchant offer program application 11 may be downloaded to apparatus 22, such as via an Intranet or other network connection or otherwise loaded from other computer readable medium, such as a compact disc, flash memory device or the like.

The local merchant offer program application 11 includes local authentication routine 50 that is configured to receive, from the customer, authentication credentials, such as username 52 and password 54 and/or customer computing device cookie 55 and receive authentication confirmation from a corresponding authentication routine 56 included in or associated with the financial institution merchant offer program application 10 executed on financial institution apparatus 12.

Thus, local authentication routine 50 and corresponding authentication routine 56 are configured to verify the identity of the user in addition to verifying that the user is a financial institution customer and, more specifically a financial institution customer authorized to participate in the merchant offer program. It should be noted that in alternate embodiments of the invention, the local authentication routine 50 may exist outside of the merchant offer program application 11 and may not be locally-based. For example, the authentication routine 50 may be an Internet-based authentication routine that is implemented through a financial institution website, such as an online banking website or the like.

In specific embodiments of the invention, the local merchant offer program application 11 may be configured to require customer authentication at the onset of launching the application, i.e., prior to receiving merchant offers. Such configuration, whereby the customer verifies identity prior to receiving merchant offers, may be necessary if the merchant offer program is configured to provide customer-specific offers based on customer attributes, customer profile data, previous customer transactions or the like. In other specific embodiments of the invention, the local merchant offer program application 11 may be configured to require customer authentication prior to accepting an offer or conducting the associated transaction. Such configuration, whereby the customer verifies identity prior to accepting an offer, may be necessary to insure that the customer is an authorized participant in the merchant offer program.

Local merchant offer program application 11 additionally includes local interface routine 60 that is configured to provide a local interface on apparatus 22 for displaying one or more merchant offers 64 to the customer, and more specifically, customer-specific merchant offers 65. The merchant offers 64 are based on a predetermined relationship between the financial institution and the merchant. In accordance with one embodiment of the invention, the predetermined relationship may include the merchant providing the financial institution customers with offers, such as discounts, rebates, and the like based, at least in part, on the financial institution guaranteeing payment for the card-not-present transactions. The local interface (e.g., widget) may be configured to be displayed or otherwise pop-up based on specific customer actions. For example, if the apparatus 22 is a personal computer and the customer accesses a merchant website on the Internet, the routine 60 may be configured to automatically display the local interface if the financial institution has a predetermined relationship with the merchant and, in some instances, if the financial institution or the merchant are currently providing offers, such as discounts, rebates or the like. In other embodiments in which the apparatus 22 is a portable or mobile computing device and the device is equipped with location determination means, such as Global Positioning Systems (GPS) devices or the like, the presence of the device at or proximate to a physical location of a merchant may cause the routine 60 to automatically display the local interface if the financial institution has a predetermined relationship with the merchant and, in some instances, if the financial institution or the merchant are currently providing offers, such as discounts or the like.

In other embodiments of the invention, the local interface may be customer activated. In such embodiments the customer may activate the local interface at his or her discretion. Further, in such embodiments, the local interface may include a search function that allows for the customer to search for merchant offers by entering a merchant name or some other merchant identifying criteria, such as physical address, product type or the like.

As previously noted, the customer may configure application 11, such that the local interface and corresponding merchant offers 64 are displayed or otherwise pop-up only based on customer defined criteria. The customer defined criteria may include product/service type, merchant type, offer type, time of day, week, etc., customer physical location and the like. Thus, customer configuration of the local interface can limit the instances in which the local interface is automatically displayed or otherwise pops-up.

Local merchant offer program application 11 additionally includes payment routine 68. In one embodiment of the invention, the payment routine 68 is configured to allow the customer to choose, on a merchant offer transaction-by-transaction basis, which financial institution account(s) should be applied to settle the transaction. The choice may be required at the time of the transaction or, the payment routine 68 may be configured to allow the customer to choose the payment account(s) within a predefined time period after the transaction. In the event that the customer does not choose the payment account(s), either at the time of the transaction or within the predefined time period depending on configuration, a customer or financial institution defined default payment account may be applied to the transaction.

Thus, the payment routine 68 may include default payment configuration 70 that provides for the customer to define default payment criteria. The default payment criteria may include identifying one or more default payment accounts, such as a customer's checking account, credit account or the like and defining one or more default payment rules, such as which account(s) apply as the default based on predefined events, such as transaction type, transaction amount transaction date/time and the like. For example the customer may define that transactions above a specified amount are settled from a credit account and that transactions below the specified amount are settled from a checking account or the like.

The payment routine 68 additionally includes customer account payment selection 72 that provides for the customer to choose one or more payment accounts at the time of the transaction or, in specific embodiments within a predefined time period after the transaction. If two or more accounts are chosen an apportionment for the accounts is needed, the apportionment may be based on predefined customer default configuration or chosen in conjunction with the selection of the accounts.

Financial institution apparatus 12 includes computing platform 13 having one or more processors 14 and a memory 16. The memory 16 of apparatus 12 includes financial institution merchant offer program application 10 that is configured to determine merchant offers based on the financial institutions predetermined relationship with specified merchants and provide the merchant offers to the customer via the local interface of the local merchant offer program application 11 executed on customer apparatus 22. In addition, financial institution merchant offer program application 10 is configured to initiate processing of guaranteed merchant payment based on a customer card-not-present transaction associated with a provided merchant offer.

Financial institution merchant offer program application 10 includes previously mentioned authentication routine 56 that is configured to receive authentication credentials, such as username 52 and password 54 and/or computing device cookie 55 from local authentication routine 50 of local merchant offer program application 11, verify the authentication credentials based on stored authentication data and return authentication confirmation to authentication routine 50. As previously noted, the system may be configured such that customer authentication provides for presentation of merchant offers and/or allows the customer to conduct transactions based on presented merchant offers. In addition, the authentication of the customer serves as the basis for providing the merchant a payment guarantee in card not-not-present transactions. Further, in alternate configurations, authentication routine 56 may be associated with the merchant offer program but reside external from the financial institution merchant offer program application 10.

Application 10 also includes merchant offer determination routine 62 configured to determine merchant offers 64 and, more specifically, customer-specific merchant offers. Customer-specific merchant offers may be based on any customer information accessible to the financial institution, such as customer profile information, customer affinity information, customer account balances, customer account types, customer transaction information and the like. In addition, the customer-specific merchant offers may be based on dynamic customer information, such as the current physical location of the customer, the current web sites being accessed by the customer or the like. Once the merchant offers 64, including customer-specific offers 65, are determined by routine 62 they are communicated to application 11 and displayed to the customer via local interface routine 60.

Financial institution merchant offer program application 10 additionally includes merchant payment routine 74 configured to receive a card-not-present transaction notification 75 associated with a transaction conducted between the authenticated customer, using the payment card, and a merchant associated with the merchant offer program. The merchant payment routine 74 will designate the payment as guaranteed by providing for a payment guarantee indicator in the transaction record and initiate payment based on the guaranteed payment instructions. In the event that transaction was a fraudulent transaction or the like, the guaranteed merchant payment designation will be invoked and the financial institution will provide settlement for the transaction amount.

In specific embodiments of the invention, the merchant payment routine 74 may include logic to verify a requisite nexus between the authentication of the customer and the card-not-payment transaction, such that the guaranteed payment indicator 86 is only added to the transaction record 84 in the event that the nexus is verified. For example, the nexus in an Internet-based card-not-present transaction may be verification that the authentication and the transaction occurred during the same Internet session as the authentication and/or that the transaction occurred within a prescribed time limit after the authentication. In another example, the nexus in a telephone-based card-not-present transaction may be verification that the authentication and the transaction occurred during the same telephone call or the like. In other embodiments of the invention, verification of the nexus between the authentication of the customer and the card-not-present transaction may occur prior to the merchant payment routine 74 receiving the card-not-present transaction notification 75; in such instances the notification 75 may include information associated with the verification of the requisite nexus.

FIG. 3 provides a block diagram illustration of a customer account apparatus 32 implemented in conjunction with a financial institution's customer account system, in accordance with an embodiment of the present invention. The customer account apparatus 32 includes a computing platform 33 having at least one processor 34 and a memory 36. The memory 36 stores account management applications 30, which are executable by processor 34. The account management applications 30 includes merchant account database 80 that includes a plurality of merchant accounts 82. The merchant accounts 82 include a listing of all outstanding transactions in which the merchant is due payment from the financial institution. Included in the listing of outstanding transactions are one or more card-not-present transaction records 84. The card-not-present transaction records 84 include a payment guarantee indicator 86 that is operable to automatically provide for financial institution payment to the merchant in the event that transaction is deemed fraudulent or the financial institution would otherwise not provide payment absent the guarantee.

The payment guarantee indicator 86 may additionally include instructions for issuing the automated and guaranteed financial institution payment, such as timing instructions and the like. The instructions for issuing the automated and guaranteed financial institution payment may be based on predetermined instructions negotiated between the financial institution and the merchant. In this regard, the payment instructions may include instructions for providing the payment within a predetermined time period, at a predetermined payment location and via a predetermined payment channel or the like.

FIG. 4 is a flow diagram of a method 90 for providing guaranteed merchant payment in card-not-present transactions, in accordance with embodiments of the present invention. At Event 92, customer authentication is determined for customer associated with a payment card. The entity issuing the payment card may conduct the authentication or a third party on behalf of the entity issuing the payment card may conduct the authentication. According to specific embodiments, authentication is performed by having the customer provide authentication criteria, such as a username and passcode and/or customer computing device cookie, and subsequently verifying the authentication criteria. The customer may provide the authentication criteria to a local authentication routine executed on a customer's computing device and the verification/determination may be provided via an authentication verification routine executed on a financial institution server, third party server or the like. In specific embodiments of the invention the authentication is conducted in conjunction with a financial institution-based merchant offer program, such that the authentication verifies the identity of the customer and the customer's enrollment in the merchant offer program.

At Event 94, notification of a card-not-present transaction is received by the card-issuing entity. The transaction is between the customer, using the payment card, and a merchant. The merchant will typically be in a predetermined relationship with the card-issuing entity, such as predetermined relationship associated with a merchant offer program or the like.

At Event 96, notification of the card-not-present transaction prompts the financial institution to automatically indicate in the merchant account record that the payment associated with the transaction is guaranteed by the financial institution. The guaranteed payment by the financial institution will automatically occur in the event that the transaction was fraudulent or otherwise would typically require the card-issuing entity to fulfill payment obligations. The guaranteed payment indication may additionally include instructions for providing the guaranteed payment, such as timing of the payment and the like.

FIG. 5 illustrates a comprehensive financial-institution-based merchant offer program environment 100 in accordance with an embodiment of the present invention. As illustrated in FIG. 5, the financial institution-based merchant offer system 3 is operatively coupled, via a network 2, to one or more customer computer systems 4 of one or more customers 6, the financial institution's customer account systems 8, and the merchant systems 9, as well as other systems at a financial institution, such as systems that maintain and administer customer accounts, which are not shown. In this way, a customer 6 located at the customer computer system 4 can receive information from and send information to the merchant offer application 10 located on the financial institution-based merchant offer system 3 through a local merchant offer application 11 and/or a web browser application 20, located on the customer computer system 4 through the network 2. The network 2 may be a global area network (GAN), such as the Internet, a wide area network (WAN), a local area network (LAN), or any other type of network or combination of networks. The network 2 may provide for wireline, wireless, or a combination of wireline and wireless communication between devices in the network.

As illustrated in FIG. 5, the financial institution-based merchant offer system 3 generally includes a communication device 12, a processing device 14, and a memory device 16. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 14 is operatively coupled to the communication device 12, and the memory device 16. The processing device 14 uses the communication device 12 to communicate with the network 2, and other devices on the network 2, such as, but not limited to, the customer computer systems 4, the customer account systems 8, and/or the merchant systems 9, as well as other systems within the financial institution that are not shown. As such, the communication device 12 generally comprises a modem, server, or other device for communicating with other devices on the network 2.

As further illustrated in FIG. 5, the financial institution-based merchant offer system 3 includes computer-readable instructions 18 stored in the memory device 16, which in one embodiment include the computer-readable instructions 18 of a merchant offer application 10. In some embodiments, the memory device 16 includes a datastore 19 for storing data related to the financial institution-based merchant offer system 3, including but not limited to data created and/or used by the merchant offer application 10.

As discussed later in greater detail, in one embodiment, the merchant offer application 10 stores or receives customer profile data and data related to offline and online transactions from the account management applications 30. The merchant offer application 10 receives data related to customer browsing behavior and returns targeted offers to the customer 6. Offers include but are not limited to products, services, discounts, coupons, promotions, add-on sales, upsells, rebates, advertisements, marketing information, etc.

As illustrated in FIG. 5, the customer computer systems 4 generally include a mobile communication device 22, a processing device 24, and a memory device 26. The processing device 24 is operatively coupled to the mobile communication device 22 and the memory device 26. The processing device 24 uses the mobile communication device 22 to communicate with the network 2, and other devices on the network 2, such as, but not limited to, the financial institution-based merchant offer system 3, customer account systems 8, and/or merchant systems 9, as well as other financial institution systems not shown. As such, the mobile communication device 22 generally comprises a modem, server, or other device(s) for communicating with other devices on the network 2, and a display, keypad, mouse, keyboard, microphone, and/or speakers for communicating with one or more users. The devices in the network can be personal computers, personal digital assistants ("PDA"), smart phone, cell phones, etc.

As further illustrated in FIG. 5, the customer computer systems 4 comprise computer-readable program instructions 28 stored in the memory device 26, which in one embodiment includes the computer-readable instructions 28 of the local merchant offer application 11 and a web browser application 20. In some embodiments, the memory device 26 includes a datastore 29 for storing data related to the customer computer systems 4, including but not limited to data created and/or used by the local merchant offer application 11 and/or the web browser application 20.

In one embodiment of the invention, the local merchant offer application 11 is the part of the merchant offer application 10 that resides on the customer computer systems 4. The local merchant offer application 11 assists in monitoring websites that the customer 6 is browsing through the web browser application 20 by monitoring and sending the information related to the customer's web browsing to the merchant offer application 10. In other embodiments of the invention there is no local merchant offer application 11, as such the merchant offer application 10, which is located on the financial institution's databases, performs the functions of the local merchant offer application 11 and, thus can interact directly with the web browser application 20 located on the customer computer systems 4. In other embodiments of the invention there is no local merchant offer application 11, as such the merchant offer application 10, which is located on the customer computer system 4, performs the functions of the local merchant offer application 11. In still other embodiments of the invention the local merchant offer application 11 is a separate application, which is located on the customer computer system 4, that works in conjunction with the merchant offer application 10.

Throughout this application the local merchant offer application 11 is described as the part of the merchant offer application 10 that resides on the customer computer systems 4; however, it is to be understood that the apparatuses and methods described herein would work equally well in the various embodiments of the merchant offer application 10 and local merchant offer application 11 described above. Regardless of the configuration, the local merchant offer application 11 displays offers, determined by the merchant offer application 10, related to what the customer is searching to the customer 6 on an interactive graphical user interface (i.e. local interface 400). The offers can be, among other things, based in part on the data stored by the merchant offer application 10 and the customer account systems 8, including but not limited to customer profile data and transaction history.

As illustrated in FIG. 5, the customer account systems 8 generally include a communication device 32, a processing device 34, and a memory device 36. The processing device 34 is operatively coupled to the communication device 32 and the memory device 36. The processing device 34 uses the communication device 32 to communicate with the network 2, and other devices on the network 2, such as, but not limited to, the merchant offer system 3, the customer computer systems 4, and/or the merchant systems 9, as well as other systems at the financial institution not shown. As such, the communication device 32 generally comprises a modem, server, or other device(s) for communicating with other devices on the network 2.

As further illustrated in FIG. 5, the customer account systems 8 comprise computer-readable program instructions 38 stored in the memory device 36, which in one embodiment includes the computer-readable instructions 38 of account management applications 30. In some embodiments, the memory device 36 includes a datastore 39 for storing data related to the customer account systems 8, including but not limited to data created and/or used by the account management applications 30.

The account management applications 30, in one embodiment, are used to store, process, and monitor the transactions, including but not limited to, deposits, withdrawals, transfers, and payments, made through various customer accounts, such as, but not limited to, checking, savings, credit card, hybrid, deposit, credit line, money market, equity line, investment, bill payment, transfer, etc. accounts. The account management applications 30 have the transaction history information for each of the financial institution's customers, in some cases, for as long as the customer's have had accounts with the bank. The transactions history information located in the account management applications is searchable and sortable over different ranges of time. The transaction information in the account management applications 30 is used by the merchant offer application 10, along with other information or alone, to determine what targeted offers and marketing information should be sent to customers 6. In some embodiments of the invention, the account management applications 30 include online financial banking applications, such as an online banking website, which allow a customer 6 to access the customer's accounts through the Internet.

As further illustrated in FIG. 5 the merchant systems 9 generally include a communication device 42, a processing device 44, and a memory device 46. The processing device 44 is operatively coupled to the communication device 42 and the memory device 46. The processing device 44 uses the communication device 42 to communicate with the network 2, and other devices on the network 2, such as, but not limited to, the merchant offer system 3, customer computer systems 4, and/or customer account systems 8, as well as other systems at the financial institution not shown. As such, the communication device 42 generally comprises a modem, server, or other device(s) for communicating with other devices on the network 2, and a display, keypad, mouse, keyboard, microphone, and/or speakers for communicating with one or more users.

As further illustrated in FIG. 5, the merchant systems 9 comprise computer-readable program instructions 48 stored in the memory device 46, which in one embodiment includes the computer-readable instructions 48 of merchant applications 40. In some embodiments, the memory device 46 includes a datastore 49 for storing data related to the merchant systems 9, including but not limited to data created and/or used by the merchant applications 40.

The merchant applications 40, in one embodiment, are used to generate, store, process, and/or monitor the offers made directly to customer computer systems 4 over the network 2 or indirectly though the merchant offer system 3.

In other embodiments of the invention, the merchant offer environment 1 will include other systems in the financial institution that are connected over the network 2. In some embodiments of the invention, the other systems within the financial institution could include transaction processing systems such as check image processing, or online account processing systems. These other systems can work in conjunction with the merchant offer system 3, or supplement and/or enhance the merchant offer system 3.

FIGS. 6A and 6B illustrate one embodiment of an integrated online payment and customer shopping process 200 that describes how a customer 6 utilizes the merchant offer environment 1 to search for offers on the Internet or in retail stores, receive offers related to the offers the customer 6 is searching, receive offers related to web-based content that the customer is accessing, and accept one or more of the offers using various forms of payment. In order to utilize the merchant offer environment 1 the customer 6, in some embodiments, downloads the local merchant offer application 11 to the customer computer system 4, as illustrated in block 202 of FIG. 6A. In some embodiments the customer computer system 4 is a computer, such as a laptop, desktop, or tablet computer, Internet television, or other electronic or digital medium device, in other embodiments the customer computer system 4 may be a mobile device, such as a PDA, cell phone, smart phone, Internet-only computer, or any other device that has Internet browsing capability.

Once the local merchant offer application 11 is downloaded to the customer computer system 4, in some embodiments it will run by communicating constantly with the merchant offer application 10 located on the merchant offer system 3. In other embodiments, the customer 6 has the ability to turn the merchant offer application 10 on and off. In still other embodiments of the invention, the customer 6 will be required to authenticate herself as the customer before using the local merchant offer application 11 and merchant offer application 10. Authentication is required in some embodiments, when the merchant offer application 10 communicates with the customer's private customer account information located on the customer account systems 8 at the financial institution. As explained in greater detail below, the merchant offer application 10 accesses the customer's account information in order to display to the customer 6, through the local merchant offer application 11, the customer's balances for the accounts that the customer can use to pay for purchases made through the merchant offer environment 1. Moreover, when the customer 6 makes a purchase through the merchant offer application 10, the merchant offer application 10 accesses the customer's account through the customer's online banking accounts and/or the customer account systems 8 in order to make real-time or near real-time transactions between the customer 6 and the merchant.

The customer 6 in some embodiments may perform the authentication when downloading the local merchant offer application 11, when the customer 6 wants to use the local merchant offer application 11, or only when the customer 6 decides to make a purchase. Generally, in exemplary embodiments, the local merchant offer application 11 runs on the customer computer system 4 at all times, and the customer only authenticates herself when the customer wants to view the identified offers or purchase something through the offers supplied by the merchant offer application 10.

As illustrated in block 204 of FIG. 6A, the customer 6 searches the Internet for content, such as products or services or other information located on websites. For example, as illustrated in FIG. 7, the customer 6 may be searching for a forty-six inch LCD television made by Company A. Block 206 in FIG. 6A illustrates that as the customer 6 is searching for a particular product (i.e. the Company A TV), the merchant offer application 10 communicates with the web browser application 20 that the customer is using, in order to determine what offers or other content the customer 6 is viewing through the web browser application 20. As illustrated in block 208 in FIG. 6A the local merchant offer application 11 transfers the information related to the content the customer is viewing back to the merchant offer application 10.

In other embodiments of the invention, the customer 6 does not have to search the Internet for offers in order for the merchant offer application 10 to gather information related to offers in which the customer 6 is interested. For example, if the local merchant offer application 11 is downloaded on a mobile device, such as a PDA, cell phone, smart phone, etc., the local merchant offer application 11 can relay information to the merchant offer application 10 about the physical location of the customer through location determining devices, such as global positioning satellite ("GPS") or radio frequency ("RF") locator systems in the mobile device. The merchant offer application 10 can then provide offers or information that are relevant to the customer's physical location, such as offers applicable to the store in which the customer is located, offers at other stores in close proximity, offers that can be purchased over the mobile device, etc.

In other embodiments of the invention, the customer 6 can use the mobile device to identify information related to an offer at a physical store. For example, information about a product can be captured by capturing an image of the product, scanning an identifier (i.e. barcode or UPC number) located on the product into the mobile device, and/or entering an identifier or keyword related to a product or service through a keyboard or voice command. The merchant offer application gathers the information related to the offer through the local merchant offer application 11, which, as explained in greater detail below, provides the customer 6 with related offers or information on the customer's mobile device.

In some embodiments of the invention, a customer can use a mobile device to make a purchase through the actual point-of-sale applications at the store in which the customer is located. In some embodiments of the invention, a mobile device that is configured with a payment system, such as a near field communication ("NFC") payment system or other payment system, can use the system to make a purchase through local merchant offer application 11 downloaded on the mobile device. The purchase, in some embodiments, takes into account real time discounts, e-Coupons, etc. available through the merchant offer application 10, as discussed in further detail later. The customer's account can be updated in real-time or near real-time to reflect the most recent transactions using a mobile device for payment.

After receiving information related to what offers or other content the customer 6 is currently viewing or searching, in some embodiments, the merchant offer application 10 analyzes the customer's past transaction purchasing history, and the customer's profile information to determine one or more offers to present to the customer 6 through the local merchant offer application 11, as illustrated by block 210 in FIG. 6A. The merchant offer application 10 analyzes the customer's past purchasing history and the customer's profile information, in part, from the account management applications 30, which store the histories of purchases made by the customer online and offline (i.e. brick and mortar stores).

In some embodiments of the invention, the financial institution may have a relationship with other financial institutions, credit card providers, Internet shopping services, etc., in order to gather more transactional data related to the customer's purchase history when the customer 6 makes transactions with other business accounts, credit cards, etc., in addition to the data that the financial institution maintains. In other embodiments the customer 6 can upload the transaction histories of transactions made with other financial institution accounts, credit cards, etc. by authorizing the financial institution to reach out and pull (or be pushed) data related to transactions from other accounts. For example, the customer 6 can provide the financial institution the account number and password to other online financial banking systems, online credit card statements, etc. and the financial institution can pull transaction information from those accounts. This additional information can be also be used to provide the customer 6 more payment options, from outside accounts, to use in completing the transaction.

In other embodiments of the invention the customer can log onto the customer's own merchant offer account in the merchant offer application 10, or other account management application 30 to provide or enter customized profile information. For example, the customer 6 can request specific types of offers, such as specific products or services, discounts, or advertisements in which the customer 6 is interested on a wish list, which is explained in further detail below. In other embodiments of the invention the customer 6 can provide profile information, which allows the merchant offer application 10 to provide more personalized offers to each individual customer 6. For example, the profile information could include, but is not limited to, places the customer 6 likes to shop, hobbies in which the customer is interested, specific offers or merchants from whom the customer 6 does or does not want to receive offers from, etc.

The offers identified by the merchant offer application 10 in block 210 and provided to the customer 6 through local merchant offer application 11, are determined in a number of ways. In exemplary embodiments, the financial institution will have in place arrangements with merchants that allow the financial institution to provide certain products or services to customers through the merchant offer application 10 at discounted prices. The financial institutional will display the various products or services that are the subject of a discount coupon, rebate, etc. The products and services will normally be displayed with the items carrying the greatest discount, coupon, rebate, etc., first. The discount, coupon, rebate, etc. can be the merchant's normal offer or can be the subject of a separate arrangement with the financial institution. In other embodiments, the merchant may pay a fee to the financial institution per month, week, etc., or a flat fee, etc., in exchange for the financial institution showing one or more of the merchant offers to customers 6. The size of discounts provided, and in some embodiments the fees paid by merchants, can be based on the number of hits the offer/website of the merchant receives, the number times the offer is displayed, the number of customers who accept the offer by making a purchase, and/or the rank of the offer, etc. In some embodiments of the invention the merchant may not offer the product at a discount, but instead the financial institution may subsidize the offer by providing the discount itself. In this instance, the financial institution would pay the merchant the full price of the product or service at the time of sale, but debit the customer account a discounted price or rebate the customers at some future point in time. The financial institution could make up for the discounts by charging the merchants a fee to display the offer to the customer 6 or by taking payments from the merchant for all of the discounts on offers provided within a certain time period.

Therefore, in some embodiments of the invention, either the merchant or the financial institution will offer customized discounts for each customer 6, which are based in part on the customer's profile data and the customer's transaction history information. As previously discussed the customer profile information could include what accounts the customer 6 has at the financial institution (checking, savings, equity line), as well as what services the customer 6 uses (such as financial planners, wealth management, etc.). The customer transaction history information could include the purchases the customer 6 has made at various stores, the costs of the purchases, time of year and day they were made, the accounts used to pay for the purchases, etc. In some embodiments, the more products or services that the merchant uses with the financial institution the greater the discount will be, the more accounts and services the customer 6 uses at the financial institution the greater the discount will be, and the more the customer 6 spends with a particular merchant the greater the discounts will be for that merchant.

The merchant offer application 10 can determine the amount of the products or services the customer 6 has with the financial institution through the customer profile information, and can use that information as a basis for making offers available to that customer 6. The amount of business includes but is not limited to, how many accounts the customer has, the amount of money in those accounts, any loans the customer 6 has with the financial institution, any financial services the customer 6 uses, etc. In one embodiment, the more products and services the customer 6 uses from the financial institution the greater the discount will be. These factors can also be combined with the customer's relationships with various merchants to determine what offers to make available to the customer 6. For example, the merchant offer application 10 can identify from the customer's transaction history what types of products and services the customer 6 has purchased from various merchants in the previous week, month, six-months, year, etc. The size of the discounts the customer 6 receives based on the customer's relationship with the merchants could based on the purchases made by the customer 6 with the merchant, and could vary in real-time or near real time each time a purchase is made or not made. For example, a merchant in some embodiments may want to offer greater discounts to a customer 6 who has not purchased anything in a while in order to try to generate new business. In other embodiments, a merchant may want to reward a loyal customer 6 in order to promote additional purchases. Therefore, in some embodiments the more the customer 6 has purchased in the past, the greater the customer's discount will be.

For example, the financial institution may have relationships with both Company B and Company C. A specific TV offered through the merchant offer application 10 by Company C may sell for ten (10) dollars less than the same TV offered through Company B, based on the financial institution's arrangements it has made with both merchants. However, when the customer 6 is searching for a specific TV (or TV's in general), the financial institution may identify the transactions the customer 6 has made with both businesses, by examining the transaction history information that the financial institution has. If the financial institution, for example, identifies that the customer 6 purchased two-thousand (2,000) dollars in products and services from Company B in the previous year, the terms of the relationship between the financial institution and Company B may dictate that the financial institution will offer the TV for one-hundred (100) dollars off of the typical price of the TV. Therefore, the customer 6 receives a more attractive price than she would have received because of the customer's 6 relationship with the financial institution and/or the merchant.

In other embodiments of the invention the merchant offer application 10, provides member offers, such as a list of product discounts, that are offered to all customers 6 of the merchant offer environment 1. In still other embodiments of the invention, the merchant offer application 10, provides public offers, such as a list of product discounts that are offered by the merchant to anyone in the public, not just members of the merchant offer environment 1. Furthermore, customized offers, member offers, or public offers are provided by the merchant offer application 10 and displayed through the local merchant offer application 11.

When the merchant offer application 10 identifies an offer for the customer 6 the local merchant offer application 11 notifies the customer 6 of the offer, as illustrated by block 212 in FIG. 6A. In one embodiment for example, as illustrated in FIG. 7, a notification indicator 304, such as a dollar sign or other icon or indicator could appear in the bottom of the web browser that the customer is using to view the merchant's website. In other embodiments, the notification indicator 304 could appear in the tool bar at the top or bottom of the web browser or computer screen display, or in other areas of the web browser or computer screen. The dollar sign, or other icon or notification indicator 304, signals to the customer 6 that the merchant offer application 10 identified an offer in which the customer 6 may be interested, which could save the customer 6 money. The offer may be relevant to a product or service the customer is viewing, it may be responsive to a wish list item, it may be based on just the customer's transaction history and/or profile information, etc.

As illustrated in blocks 214 and 216 of FIG. 6B, when the customer 6 selects the notification indicator 304, a pop-up window, such as a local interface 400, or other display is provided on the computer screen, or other device, illustrating the offers identified by the merchant offer application 10 as shown in FIG. 8. In some embodiments of the invention the customer 6 does not need to select the indicator to view the local interface 400. In some embodiments, the local interface 400 automatically pops-up on the screen when the merchant offer application 10 identifies an offer. In other embodiments of the invention, when an offer is identified the offer appears within the web-browser or web-browser page that the customer 6 was viewing.

The pop-up window, such as the local interface 400, provides the customer 6 with offers related to products or services, or content that the customer 6 is currently viewing at an Internet website of a merchant, products or services listed on the customer's wish list, or product or services of interest to the customer 6 based on the customer's transaction history and/or customer profile. The offers provided to the customer 6 in the window reflect offers, prices, and discounts from the current merchant or other merchants in which the customer 6 may be interested. The offers can be ranked based on various factors, such as but not limited to the discounts offered, agreements between the merchants and the financial institutions, etc. The offers, in some embodiments will include links, such as to the merchant's web pages, which provide more information about the relevant offers.

As illustrated in FIG. 9, in an exemplary embodiment of the invention, the local merchant offer application interface 400 has two sections, the accounts section 410, and the offers section 430. The accounts section 410 illustrates the available balances the customer 6 has in each of the customer's accounts. The merchant offer application 10 communicates with the local merchant offer application 11 and the account management applications 30 in the customer account systems 8 to determine and display the account balances in the local interface 400. Other sections that contain other types of information, for instance the customer's monthly budget, etc. can also be displayed in the local interface 400.

The offer section 430, in some embodiments, displays the other retailers 432 that can offer the same or similar product, the offer description 434 illustrating what the offer is (the same product or a similar one), the percent savings 436, and the actual dollar amount savings 438. In other embodiments of the invention the offer section 430, another section, or a separate tab displays related or add-on products in which the customer 6 may be interested. For example, if a customer is searching for a forty-six inch LCD TV the customer may also be interested in DVD players, or services such as Direct TV®. In one embodiment of the invention, a "see related offers" section button 440 or tab is selected by the customer 6 in order to view any related offers identified by the merchant offer application 10, as illustrated in FIG. 9. However, in some embodiments the related offers are displayed in the offer section 430 along with the product for which the customer 6 is searching. In still other embodiments of the invention, the local merchant offer application interface 400 has an advertisement section 450 that displays one or more targeted advertisements to a customer 6 based on the customer's previous purchasing history, customer profile information, and/or website content that the customer 6 is currently viewing.

As illustrated by block 218 in FIG. 6B, in some embodiments the local interface 400 provides links to websites that contain additional information about the products or services that are the subject of the offers or related offers in the offers section 430. The customer 6 selects the offer and is then taken to a website, such as the merchant's website, other website, or a display in the local interface 400, which provides more information about the savings provided by the offers. Block 220 in FIG. 6B illustrates that the customer can select the original offer that the customer 6 located or one of the replacements offers that the merchant offer application 10 identified and displayed to the customer 6.

As illustrated the by block 222 in FIG. 6B the customer 6 can also purchase related products or services in addition to, or in lieu of, the originally located products or services or replacement products or services displayed by the merchant offer application 10.

In some embodiments, the customer 6 will have to authenticate herself in order for the merchant offer application 10 to communicate with the account management applications 30, such as the customer's online banking accounts, in order to display the customer's real-time account balances. In other embodiments of the invention, the merchant offer application 10 estimates the customer's account balances based on what the balances were the last time the customer 6 made a purchase or authenticated herself. In some embodiments of the invention, the local interface 400 displays the account balances for the customer's checking account 412, savings account 414, credit card account 416, and any reward points 418 that the customer has accumulated. In still other embodiments, after the customer 6 makes purchases, the account balances displayed in the local interface 400 are updated in real-time in order to show the customer 6 how much money the customer 6 has available in each of her accounts.

In other embodiments of the invention, if the customer 6 grants access, the local merchant offer application 11 can also display the account information, such as balances, of other accounts or credit cards maintained by outside financial institutions. In these embodiments, the financial institution may have a relationship with the outside financial institutions and/or the customer 6 has supplied the merchant offer application 10 with access to the outside accounts (i.e. by providing the sign in and password information for online banking services).

After the customer 6 selects the products or services she wants to purchase, either through the Internet or at a physical store, the merchant offer application 10 assists the customer in determining how she wants to pay for the products or services. As illustrated by block 224 in FIG. 6B the customer 6 selects from which account or multiple accounts the customer 6 wants to pay for the offer selected. In some embodiments of the invention the customer's preference for paying for an offer from a particular account or set of accounts is stored in the customer profile information in the merchant offer application 10, and in such circumstances, the predetermined preference acts as a default. In some embodiments of the invention, the necessary financial and shipping information is pre-populated at check-out when the customer 6 makes a purchase. In other embodiments of the invention, the customer 6 is prompted at checkout as to how the customer wants to pay for the products and services selected. In such embodiments, a list of the customer's accounts is provided in the local interface 400 or in another pop-up window. While the financial institution will pay the merchant the full amount of the offers or the discounted amounts, in some embodiments the customer can tell the financial institution how to apply the cost of the products or services to the customer's accounts. For example, the customer for one purchase may indicate that she wants to pay 20% from her checking account and 80% from her savings account. The amounts and the various accounts can be changed for every purchase made. The decision of what account or accounts are used to make payments can be made in some embodiments at the time of purchase. In other embodiments of the invention, the customer 6 has a period of time to determine what account or accounts are debited. In such embodiments of the invention, the customer 6 logs into her online banking, merchant offer, or other account and, either at the time of purchase or thereafter, associates particular transactions and transaction amounts with particular accounts.

In some embodiments of the invention, the financial institution effectively becomes a clearing house for any of the transactions made between the customer 6 and the merchant. After the customer 6 authenticates herself as an actual customer of the financial institution, in some embodiments the financial institution guarantees payment to the merchant for the products and services. The financial institution is able to determine in each instance whether it wants to assume the risk for the transaction based on information the financial institution has for each of its customers. This is a benefit over independent credit card issuers because these companies do not know the financial well-being of one their customers outside of the customers' credit card balances and payment histories. In this respect, the merchant offer application 10 can be utilized to help customers from over spending their means and can assist the financial institution in managing risks attendant to extending consumer credit.

The actual purchase of the selected products and services from the merchant through the merchant offer environment 1 is achieved in a number of ways. For example, in one embodiment of the invention, the links for particular offers in the local interface 400 take the user to the merchant's secure website. However, in other embodiments of the invention, the links take the customer 6 to the public merchant website and the financial institution can pre-populate the account information, as well as the mailing information. In other embodiments of the invention, the account information can be a preapproved single use account number provided by the financial institution, which ties the customer 6 to the customer's accounts at the financial institution, without disclosing the customer's real account information to the merchant. In those instances where the financial institution has a pre-existing relationship with the applicable merchant, the transaction that takes place can be virtually instantaneous. The financial institution can credit the account of the merchant, if the merchant has an account at the financial institution, or in other embodiments of the invention, the financial institution can electronically transfer the money to the merchant. Alternatively, the financial institution can credit the merchant for the customers purchase on a schedule that is prearranged and agreed to by the financial institution and merchant.

After the payment method is satisfied, either the customer 6 or the financial institution can transfer the shipping address of the customer 6 to the merchant for shipping the product or providing the service. In lieu of the merchant shipping a product to the customer 6, the customer 6 can pick-up the product at the store. Alternatively, if the customer is making the purchase at a brick and mortar location the customer 6 can simply pick-up the product when purchased.

In other embodiments of the invention, the financial institution provides various financing options for the customer 6 to use in paying for the selected products or services. For example, the financial institution can allow the customer to make a purchase from a merchant, but not debit the customer's account or accounts for 30, 60, 90, etc. days. As is the case with the amount of discounts provided to various customers 6, different financing options can be provided to customers depending, in some embodiments for example, on the customer's standing with the financial institution and the number of financial of products and services the customer uses with the financial institution.

Likewise, with respect to the financial institution making payments to a merchant, there are a number of options available to complete the transition as far as the merchant is concerned. In some embodiments of the invention, the payment system and process provides settlement options to the merchant, such as real-time, 3-day, 15-day, etc. The merchants can be charged different types of fees, or no fees, depending on what payment options the merchants require. Different options may apply in different circumstances. For instance, a different settlement option might apply to different products sold by the merchant depending upon the merchant's payment obligations to its suppliers. In other embodiments, the payment options may vary depending upon the merchant's financial situation, need for cash flows, lines of credit etc. The payment option variables are monitored electronically by the financial institution, and the appropriate payment option can be selected automatically based on a series of rules in the merchant offer application.

In some embodiments of the invention the steps in blocks 204 to 224 are repeated every time the customer 6 visits a new web-site, selects a different product or service from the web-site the customer 6 is currently viewing, or when the merchant offer application 10 identifies a product or service for the customer 6 based on the customer's wish list, transaction history, or customer profile.

After a customer 6 selects a product or service, replacement, or add-on to purchase, the merchant offer application 10, in some embodiments of the invention, provides online social networking opportunities. For example, the customer 6 can rate a specific offer, merchant, or discount program. In other embodiments of the invention, the customer 6 can display in the local interface 400 the most popular offers as rated by other customers who have accepted the offer. Furthermore, in other embodiments of the invention the customer 6 can suggest to other customers a purchase or discount, that the customer 6 made, by sending an e-mail, instant message notification, text message, or other notification through a messaging service in the merchant offer application 10 or through other standard messaging formats using the merchant offer application 10. In other embodiments of the invention, the customer may join social networks or groups through the merchant offer application 10, which allow the customer 6 and other members of the groups to receive special offers that only members of the specific group can receive and use.

In addition to displaying add-on products and services, while the customer 6 is searching for specific products or services on the Internet, the merchant offer application 10 will also make add-on product or service suggestions after the customer has purchased a product or service through the merchant offer application 10. In some embodiments of the invention some types of add-ons can only be made after a particular offer is accepted and purchased by the customer 6. For example, an extended warranty for a particular product such as a forty-six inch Company A television offered through a merchant is only available for purchase through that merchant if the actual product is purchased through that merchant. These additional add-ons, in some embodiments, can be displayed to the customer 6 through the local merchant offer application interface 400, after the customer 6 has purchased a particular product or service. In other embodiments of the invention the add-ons are sent to the customer 6 through e-mail, text message, instant message, or other like form of communication. In other embodiments of the invention, some add-ons are provided by the merchant offer application 10 and are based in part on product type. For example, when a blue-ray DVD player is purchased the add-ons will include Blue-ray DVDs as opposed to regular DVDs, because the customer would not likely want Blue-ray DVDs if she purchased a regular DVD player.

In some embodiments of the invention the merchant offer application 10 has a search feature that allows a customer to search for available offers, through the local merchant offer application 11, by product (i.e. SKU, model, etc.), merchant, product type, brand, manufacturer, price, discount price, location, etc. The discounts provided to the customer 6 during the search can be customized for each individual user based on relationships between the financial institution and merchants, the customer's profile information, the customer's transaction history, and/or publicly available discounts. The offers from the search, in some embodiments, are prioritized based on the customer's location, transaction history, profile information, etc.

In some embodiments of the invention the customer might not be able to find the particular product or service for which the customer 6 is searching because the product is out of stock or the service is booked, the product or service is too expensive for the customer 6, the product or service cannot be delivered in time, etc. In such cases, the merchant offer application 10 provides the customer 6 the ability to add a particular desired product or service to a wish list. The customer's individual wish list, in some embodiments, has one or more products and services that have notification alerts attached to them. The notification alerts inform the merchant offer application 10 to watch for offers for those specific products or services, and any discounts related to them. The customer can also add merchants to the wish list in order to be notified when a specific merchant is providing discounts to customers.

When the merchant offer application 10 identifies the availability of a product or service that is on the customer's wish list, the merchant offer application 10 notifies the customer. For example, the customer can identify a specific product or service, such as a forty-six inch TV, and/or a specific price for the product or service, such as one-thousand three-hundred (1,300) dollars for the forty-six inch TV. The merchant offer application 10 monitors the databases 19 in merchant offer system 3, or in some embodiments searches the Internet, for the product or service that meets the particular parameters that the customer 6 wants. The merchant offer application 10 notifies the customer 6 when one or more merchants meet the customer's parameters. In other examples, the customer 6 can identity a specific merchant, such as Company B, or a specific type of product or service, such as a flat screen TV, and request that the merchant offer application 10 notify the customer when the merchant is having a sale, or when sales are occurring for that type of product or service. In this way the customer 6 does not have to continuously search for a product or service. Instead, the customer 6 lets the merchant offer application 10 identify the product or service for the customer 6, and then receives a notification when the particular product or service is identified.

In some embodiments of the invention the customer 6 can be notified of products or services, coupons, advertisements, reward cards or points from a merchant, etc., by the merchant offer application 10 when the customer is not even searching the web for a specific offer. The merchant offer application 10, in some embodiments, uses the customer's wish list, or the customer's profile data and transaction history, to notify the customer when one or more merchants are offering a particular product or service in which the customer 6 might be interested. In one embodiment of the invention, the offers found by the merchant offer application 10 are sent to the user though various communication channels, such as, but not limited to e-mail, SMS, text messages, financial institution statements, on receipts for purchases online or at brick an mortar institutions, or ATM transactions, etc.

In some embodiments of the invention, the financial institution can monitor each customer's savings realized and not realized by using or not using the merchant offer application 10. A system and process is used for determining and displaying to customers 6 the amount of money saved, including, but not limited to percentages saved, total savings, what could have been saved, etc. The merchant offer application 10, either online, though the local merchant offer application 11 or online banking, or through paper statements, illustrates the amount of money the user saved or could have saved by using the merchant offer application 10 on both a total basis over a specified time period, as well as on a transaction-by-transaction basis. In other embodiments of the invention, the amount saved if the customer 6 would have enrolled in more financial institution product or services could also be illustrated online or in paper statements. Also in some embodiments of the invention, discounts, e-coupons, merchants, etc. can be suggested for future purchases through the online or paper statements.

In other embodiments of the invention the merchant offer application 10 is accessed though and runs inside one or more of the account management applications 30, such as an online financial banking application. For example, in some embodiments the customer 6 logs onto to the customer's online financial banking accounts, and searches for offers through the online financial banking account application. The merchant offer application 10, acting through the online financial banking account application, provides offers, add-ons, etc. to the customer 6 as previously discussed. However, in this embodiment the offers are displayed though the online financial banking application not through a separate local merchant offer application 11 that was downloaded to the customer computer systems 4. Therefore, in this embodiment, the customer 6 could use the merchant offer application 10 on any computer because the merchant offer application 10 and local merchant offer application 11 are run through an online financial banking application and are not tied to a customer's specific computer system 4.

The merchant applications 40, in some embodiments, allow the merchants to access the merchant offer application 10 over the network 2 through the merchant offer system 3. The merchant offer application 10, in some embodiments, has a merchant interface that the financial institution uses to mange the merchant network by only allowing access to the merchant interface to specific merchants that the financial institution has certified for inclusion into the merchant offer environment 1. The merchant interface allows a merchant to enter offers into the merchant offer application 10 that are available to all customers 6, groups of customers 6, or individual customers 6 based on customer demographic information. In some embodiments, the merchant interface also allows a merchant to monitor its offers, such as the status and success of its offers.

The financial institution will first determine what merchants to certify for access to the merchant offer application 10. In some embodiments, the merchant must meet quality standards set by the financial institution before the merchant is certified. In some embodiments, the quality standards include the financial stability of the merchant, customer ratings of the merchant, supplier and distributor ratings of the merchant, product or service delivery time, payment timeliness, etc. These factors can be determined by the financial institution through a number of different channels. For example the merchant financial stability could be determined from the accounts the merchant has with the financial institution, other financial institutions, or outside rating agencies. Customer, supplier, or distributor ratings of the merchant can be determined from consumer advocacy groups, or other rating organizations, that the financial institution uses or with which the financial institution has partnered.

After the financial institution certifies the merchants for access to the merchant interface, the financial institution provides the merchants with user names and passwords or other merchant authentication mechanisms that allow the merchant to access the merchant interface through the merchant offer application 10. Thereafter, the merchant can access the merchant interface and authenticate that the financial institution has certified that the merchant can access the merchant offer application 10. The authentication mechanisms also indicate to the financial institution that the current user has authority to create and/or monitor offers for the particular merchant. The merchant can then begin to enter offers for the financial institution's customers 6.

In some embodiments the merchant can create, modify, and control the offers in the merchant applications 40 and upload the offers to the merchant offer application 10. In other embodiments of the invention the merchant can create the offers directly in the merchant offer application 10, through the merchant interface.

In some embodiments of the invention, when entering offers into the merchant offer application 10 the merchant can set various preferences associated with a product or service, such as, but not limited to, a specific price or price range for which the merchant is willing to sell a product or service, a discount percentage to offer, identification of products or services or types of products or services to which to apply the offer, how long the offer will be available to customers, if the offer changes over time, if additional discounts apply to the product or service, etc. For example, to name a few, the merchant may set a particular price for a product or service which will gradually decline in price automatically every month. The merchant may indicate that an offer is only good for a month. The merchant may also indicate that a product or service will have an additional discount if the customer purchases other products or services from the merchant at the same time. The merchant may offer credits or rebates to all the customers who purchase a product or service, if there are a specified number of sales of the product or service.

In some embodiments of the invention, the merchant can also set what customer should receive the offers based on customer demographic information, such as, but not limited to age, geographic location, customer purchasing history, groups or clubs the customer is associated with, etc. For example, some offers may apply to all of the customers 6 in the merchant offer application. However, some offers may only apply to customers who live in a particular state or region. The merchant may also limit offers to individual customers 6 who have spent a specific amount of money with the merchant in the past, or who have purchased a specific product or service from the merchant over a specific time frame.

The offers entered into the merchant offer application 10 can be provided to customers 6 in real-time, or in other embodiments can be set to take effect at a later date in the future or not until the financial institution has approved the offer submitted by the merchant. The merchant has the ability, in some embodiments, to update the offers that they entered into the merchant offer application 10 anytime to try to influence sales of various products or services. However, in some embodiments, some offers may not be able to be changed for a period of time once they are imputed into the system.

Since the financial institution is providing a service to its customers 6 by providing offers to the customers 6 from various merchants, any merchants who are not providing adequate customer service are also reflecting negatively on the financial institution. Therefore, not only does the financial institution has the ability to manage the merchants in the merchant offer environment 1 by determining what merchants are allowed into the merchant offer environment 1, but they also have the ability to remove merchants from the merchant offer environment 1. In some embodiments, the financial institutions can make periodic reviews of merchants that have been certified, in order to make sure the merchants are still financially stable, or have received positive customer feedback.

In some embodiments, the merchant interface allows the merchant to monitor current offers. For example, the merchant interface may create charts, graphs, tables, and/or other statistics for the merchant and display these to the merchant when the merchant logs into the merchant interface. These statistics may relate to particular offers and the success thereof, such as how often they are displayed to potential customers, how often they are accepted, the amount of money being made or discounted, and/or the like. The statistics may also provide an overview of the success of the overall relationship with the financial institution and use of the merchant offer system 3.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for providing guaranteed merchant payment for a card-not-present transaction, the method comprising:
   determining, by a computing device processor, authentication of a customer associated with a payment card, wherein the authentication is determined by one of an entity issuing the payment card or a third party under a directive of the entity;
   receiving, at a computing device, notification of a first card-not-present transaction conducted between the customer, using the payment card, and a first merchant;
   verifying, by a computing device processor, a nexus between the first card-not-present transaction and the authentication, wherein verifying the nexus includes one of verifying that the authentication and the first card-not-present transaction occurred during a same Internet session or verifying that the first card-not-present transaction occurred within a predetermined time limit after the authentication; and
   in response to verifying the nexus, indicating, by a computing device processor, in a first transaction record that the first merchant is guaranteed payment, for the first card-not-present transaction, by the entity issuing the payment card based on the authentication of the customer, wherein the indication in the first transaction record provides for the first merchant to be paid for the first card-not-present transaction based on either the customer failing to fulfill their payment obligation for the transaction or the transaction being deemed fraudulent.

2. The method of claim 1, wherein determining authentication further comprises verifying, via a computing device processor, a customer name and customer password.

3. The method of claim 1, wherein determining authentication further comprises verifying, via a computing processor, a cookie stored on a computing device associated with the customer.

4. The method of claim 1, further comprising providing, via computing device processor, the guaranteed payment to the first merchant within a predetermined period of time.

5. The method of claim 1, further comprising providing, via a computing device, one or more offers, associated with the first merchant, to the customer.

6. The method of claim 5, wherein receiving further comprises receiving, at the computing device, the notification of the first card-not-present transaction, wherein the first card-not-present transaction is based on customer acceptance of at least one of the one or more offers.

7. The method of claim 5, wherein determining authentication further comprises determining, via the computing device processor, authentication of the customer prior to providing the one or more offers to the customer.

8. The method of claim 7, wherein providing the one or more offers further comprises determining, via a computing device, customer-specific offers based on the authentication of the customer.

9. The method of claim 1, further comprising:
   receiving, at a computing device, notification of a second card-not-present transaction associated with the payment card and conducted between the customer and a second merchant; and
   indicating, via a computing device processor, in a second transaction record that the second merchant is guaranteed payment, for the card-not-present transaction, by an entity issuing the payment card based on the authentication of the customer.

10. An apparatus for providing guaranteeing merchant payment in a card-not-present transaction, the apparatus comprising:
- a computing platform including at least one processor and a memory;
- an authentication routine stored in the memory executable by the processor and configured to determine authentication of a customer associated with a payment card, wherein the authentication is determined by one of an entity issuing the payment card or a third party under a directive of the entity;
- a merchant payment routine stored in the memory executable by the processor and configured to (1) receive notification of a first card-not-present transaction conducted between the customer, using the payment card, and a first merchant, (2) verify a nexus between the first card-not-present transaction and the authentication by one of verifying that the authentication and the first card-not-present transaction occurred during a same Internet session or verifying that the first card-not-present transaction occurred within a predetermined time limit after the authentication and, (3) in response to verifying the nexus, indicate in a first transaction record that the first merchant is guaranteed payment, for the card-not-present transaction, by an entity issuing the payment card based on the authentication of the customer, wherein the indication in the first transaction record provides for the first merchant to be paid for the first card-not-present transaction based on either the customer failing to fulfill their payment obligation for the transaction or the transaction being deemed fraudulent.

11. The apparatus of claim 10, wherein the authentication routine is further configured to verify a customer name and customer password.

12. The apparatus of claim 10, wherein the authentication routine is further configured to verify a cookie stored on a computing device associated with the customer.

13. The apparatus of claim 10, wherein the merchant payment routine is further configured to provide the guaranteed payment to the first merchant within a predetermined period of time.

14. The apparatus of claim 10, further comprising a merchant offer routine stored in the memory, executable by the processor and configured to provide one or more offers, associated with the first merchant, to the customer.

15. The apparatus of claim 14, wherein the merchant payment routine is further configured to receive the notification of the first card-not-present transaction, wherein the first card-not-present transaction is based on customer acceptance of at least one of the one or more offers.

16. The apparatus of claim 14, wherein the authentication routine is further configured to determine authentication of the customer prior to providing the one or more offers to the customer.

17. The apparatus of claim 16, wherein the merchant offer routine is further configured to determine customer-specific offers based on the authentication of the customer and provide the customer-specific offers, associated with the first merchant, to the customer.

18. The apparatus of claim 10, wherein the merchant payment routine is further configured to receive notification of a second card-not-present transaction associated with the payment card and conducted between the customer and a second merchant, and indicate in a second transaction record that the second merchant is guaranteed payment, for the card-not-present transaction, by an entity issuing the payment card based on the authentication of the customer.

19. A computer program product comprising:
a non-transitory computer-readable medium comprising:
- a first set of codes for causing a computer to determine authentication of a customer associated with a payment card, wherein the authentication is determined by one of an entity issuing the payment card or a third party under a directive of the entity;
- a second set of codes for causing a computer to receive notification of a first card-not-present transaction conducted between the customer, using the payment card, and a first merchant;
- a third set of codes for causing a computer to verify a nexus between the first card-not-present transaction and the authentication, wherein verifying the nexus includes one of verifying that the authentication and the first card-not-present transaction occurred during a same Internet session or verifying that the first card-not-present transaction occurred within a predetermined time limit after the authentication; and
- a fourth set of codes for causing a computer to, in response to verifying the nexus, indicate in a first transaction record that the first merchant is guaranteed payment, for the card-not-present transaction, by an entity issuing the payment card based on the authentication of the customer, wherein the indication in the first transaction record provides for the first merchant to be paid for the first card-not-present transaction based on either the customer failing to fulfill their payment obligation for the transaction or the transaction being deemed fraudulent.

20. The computer program product of claim 19, wherein the first set of codes is further configured to cause the computer to verify a customer name and customer password.

21. The computer program product of claim 19, wherein the first set of codes is further configured to cause the computer to verify a cookie stored on a computing device associated with the customer.

22. The computer program product of claim 19, further comprising a fifth set of codes for causing a computer to provide the guaranteed payment to the first merchant within a predetermined period of time.

23. The computer program product of claim 19, further comprising a fifth set of codes for causing a computer to provide one or more offers, associated with the first merchant, to the customer.

24. The computer program product of claim 23, wherein the second set of codes is further configured to cause the computer to receive the notification of the first card-not-present transaction, wherein the first card-not-present transaction is based on customer acceptance of at least one of the one or more offers.

25. The computer program product of claim 23, wherein the first set of codes is further configured to cause the computer to determine authentication of the customer prior to providing the one or more offers to the customer.

26. The computer program product of claim 25, wherein the fifth set of codes is further configured to cause the computer to determine customer-specific offers based on the authentication of the customer and provide the customer-specific offers, associated with the first merchant, to the customer.

27. The computer program product of claim 19, wherein the second set of codes is further configured to receive notification of a second card-not-present transaction associated with the payment card and conducted between the customer and a second merchant, and the third set of codes is further configured to cause the computer to indicate in a second transaction record that the second merchant is guaranteed payment, for the card-not-present transaction, by an entity issuing the payment card based on the authentication of the customer.

* * * * *